(12) United States Patent
Halvorson

(10) Patent No.: US 10,424,149 B1
(45) Date of Patent: Sep. 24, 2019

(54) GAMING SYSTEM WITH MULTIPLE AWARD WHEELS

(71) Applicant: ADP GAUSELMANN GMBH, Espelkamp (DE)

(72) Inventor: Michael Charles Halvorson, Las Vegas, NV (US)

(73) Assignee: ADP GAUSELMANN GMBH, Espelkamp (DE)

( * ) Notice: Subject to any disclaimer, the term of this patent is extended or adjusted under 35 U.S.C. 154(b) by 0 days.

(21) Appl. No.: 16/150,144

(22) Filed: Oct. 2, 2018

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/326* (2013.01); *G07F 17/3244* (2013.01)

(58) Field of Classification Search
CPC .... G07F 7/588; G07F 17/326; G07F 17/3213; G07F 17/3244
See application file for complete search history.

(56) References Cited

U.S. PATENT DOCUMENTS

| | | | |
|---|---|---|---|
| 6,705,944 B2 | 3/2004 | Luciano | |
| 7,625,278 B2 | 12/2009 | Paulsen et al. | |
| 9,805,542 B2 | 10/2017 | Rodgers et al. | |
| 2003/0003979 A1* | 1/2003 | Seelig | G07F 17/3211 463/16 |
| 2003/0203753 A1* | 10/2003 | Muir | G07F 17/32 463/20 |
| 2011/0086695 A1* | 4/2011 | Evans | G07F 17/34 463/20 |
| 2014/0162751 A1* | 6/2014 | Ryan | G07F 17/3244 463/20 |
| 2015/0170462 A1* | 6/2015 | Berman | G07F 17/34 463/20 |
| 2018/0225926 A1* | 8/2018 | Wortmann | G07F 17/3267 |

* cited by examiner

*Primary Examiner* — Jason T Yen
(74) *Attorney, Agent, or Firm* — Resolute Legal, PLLC

(57) ABSTRACT

In accordance with various aspects of the present disclosure, the gaming system is configured to provide a game having certain symbols that, when aligned in predetermined relationships, cooperate to trigger a combination of the certain symbols. The gaming system may use the combination of the certain symbols to generate new awards, additional game phases, or some combination of both.

18 Claims, 14 Drawing Sheets

| SYMBOL | SYMBOL ID | TYPE | C01 | C02 | C03 | C04 | R11 | R12 | R13 | R14 | R21 | R22 | R23 | R24 |
|---|---|---|---|---|---|---|---|---|---|---|---|---|---|---|
| | C01 | WHEEL | 0 | 0 | 1 | 0 | 0 | 0 | 0 | 0 | 0 | 0 | 0 | 0 |
| | C02 | WHEEL | 0 | 0 | 0 | 1 | 0 | 0 | 0 | 0 | 0 | 0 | 0 | 0 |
| | C03 | WHEEL | 1 | 0 | 0 | 0 | 0 | 0 | 0 | 0 | 0 | 0 | 0 | 0 |
| | C04 | WHEEL | 0 | 1 | 0 | 0 | 0 | 0 | 0 | 0 | 0 | 0 | 0 | 0 |
| | R11 | SLOT | 0 | 0 | 0 | 0 | 0 | 0 | 0 | 0 | 1 | 0 | 0 | 0 |
| | R12 | SLOT | 0 | 0 | 0 | 0 | 0 | 0 | 0 | 0 | 0 | 0 | 0 | 0 |
| | R13 | SLOT | 0 | 0 | 0 | 0 | 0 | 0 | 0 | 0 | 0 | 0 | 1 | 0 |
| | R14 | SLOT | 0 | 0 | 0 | 0 | 0 | 0 | 0 | 0 | 0 | 0 | 0 | 0 |
| | R21 | SLOT | 0 | 0 | 0 | 0 | 1 | 0 | 0 | 0 | 0 | 0 | 0 | 0 |
| | R22 | SLOT | 0 | 0 | 0 | 0 | 0 | 0 | 0 | 0 | 0 | 0 | 0 | 0 |
| | R23 | SLOT | 0 | 0 | 0 | 0 | 0 | 0 | 1 | 0 | 0 | 0 | 0 | 0 |
| | R24 | SLOT | 0 | 0 | 0 | 0 | 0 | 0 | 0 | 0 | 0 | 0 | 0 | 0 |

FIG. 9

GAMING SYSTEM WITH MULTIPLE AWARD WHEELS

FIELD

The present disclosure relates to gaming systems.

BACKGROUND

Gaming systems accept wagers from players in exchange for opportunities to win awards or prizes. Current gaming systems combine various specialized computing technologies to provide systems adapted to gain the attention of players and to keep them engaged with the gaming systems. To retain players' interest, gaming systems that offer new and unconventional functionality are needed.

SUMMARY

Implementations consistent with the present disclosure provide systems and processes for gaming systems. In accordance with one aspect of the present disclosure, the gaming system is configured to provide a game having certain symbols that, when aligned in predetermined relationships, cooperate to trigger a combination of the certain symbols. The gaming system may use the combination of the certain symbols to generate new awards, additional game phases, or some combination of both.

In various implementations of the systems and processes, the gaming system randomly generates symbols from one or more sets of symbols and determines an outcome of a first phase of the game (e.g., a slot machine game). In an implementation of the first phase of the game, the gaming system displays such randomly generated symbols in a game display area using a display device. The gaming system evaluates such randomly generated symbols to determine any awards, including the award of a further phase (i.e., a second phase) of the game. It should be appreciated that although one or more game phases are disclosed herein, in various embodiments, a game does not require distinct phases, or any phases. That is, one or more phases of the game discussed herein may simply be features of the game discussed without distinct phases.

In one implementation, during the first phase of the game the gaming system generates symbols from one or more set(s) of symbols (also referred to herein as symbol set(s)) that can include full symbols and partial symbols. The full symbols can include conventional slot machine symbols (e.g., card symbols, fruit symbols, etc.). The partial symbols can be complimentary shapes that may be the same or different from one another and that, when aligned in a predetermined relationship in visible areas of the game display, combine to trigger a second phase of the game and form a new game display area (e.g., a second game display area displaying a game display, which may be an award wheel or additional slot machine reels). It should be appreciated that the new game display area may also simply be a feature of the game. In some implementations, the new game display area or second game display area is within the game display. In some implementations, the new game display area or second game display area is outside of the game display.

In accordance with some aspects of the present disclosure, the gaming system identifies partial symbols included in an outcome of the first phase of a game and determines whether the partial symbols include complimentary shapes displayed in adjoining symbol display positions (e.g., adjacent positions on neighboring reels of a slot machine). In some implementations, the gaming system also determines whether the adjoining partial symbols are displayed in a combinable orientation. For example, the gaming system's first phase outcome may display two partial symbols (e.g., two semi-circular partial symbols representing portions of an award wheel) aligned in a predetermined relationship (e.g., displayed in side-by-side adjoining display positions) on the gaming system display. In such case, the gaming system may determine whether the semi-circular partial symbols are suitably oriented to trigger a second phase of the game (e.g., the semi-circular partial symbols are displayed with their flat sides facing one another). If the gaming system determines that the flat sides are not suitably oriented, then the gaming system does not combine the semi-circular partial symbols into a second game display and does not provide the second phase of the game. On the other hand, if the gaming system determines that the partial symbols are suitably oriented so as to be combined into a complete circle, the gaming system combines (e.g., fuses) the two semi-circular partial symbols at their flat sides to form a second game display (e.g., an award wheel) and triggers a second phase of the game.

In some implementations, the second game display may be presented in a game display area overlaying the first game display at a location of the combined partial symbols. The gaming system may, in some implementations, initiate a second game phase that may include game play conducted via the second game display. The second game phase may provide outcomes that pay additional awards. In some implementations, the second game phase may also include at least one outcome that may trigger a third game phase (e.g., another game wheel) providing additional random outcomes that result in further awards for a player.

As described above and set forth in greater detail below, gaming systems in accordance with aspects of the present disclosure provide a specialized computing device including non-conventional hardware and software that improve upon the existing technology of human-computer interfaces by providing unconventional functionality generating display outputs. Such display outputs can selectively activate varying number of game phases based on a type, location, and orientation of partial symbols displayed in a first phase of the game. Doing so improves the operation of the gaming systems for their specialized purpose by reducing player disappointment with game outcomes by enhancing player and increasing player engagement with the gaming system.

BRIEF DESCRIPTION OF THE DRAWINGS

The accompanying drawings, which are incorporated in and constitute a part of this specification, illustrate the present teachings and together with the description, serve to explain the principles of the disclosure.

FIG. 9 shows a picture illustrating an example of a data structure of a gaming system identifying combinable and non-combinable partial symbols.

DETAILED DESCRIPTION

The present disclosure relates to gaming systems and, more specifically, systems and processes for gaming systems. As described previously, various implementations provide a game including a first phase that randomly generates and displays symbols that include full symbols and partial symbols having complimentary shapes. When the symbols generated by the first phase include complementary partial symbols aligned in adjoining locations and, in some implementations, in combinable orientations, the gaming system provides a second phase (e.g., an award wheel game) by combining the complementary partial symbols into a second game display. An outcome of the second game can provide additional awards and trigger symbols that trigger a third phase. The third phase can use a third game display and provide further awards.

Gaming System Platform

Figure 1:
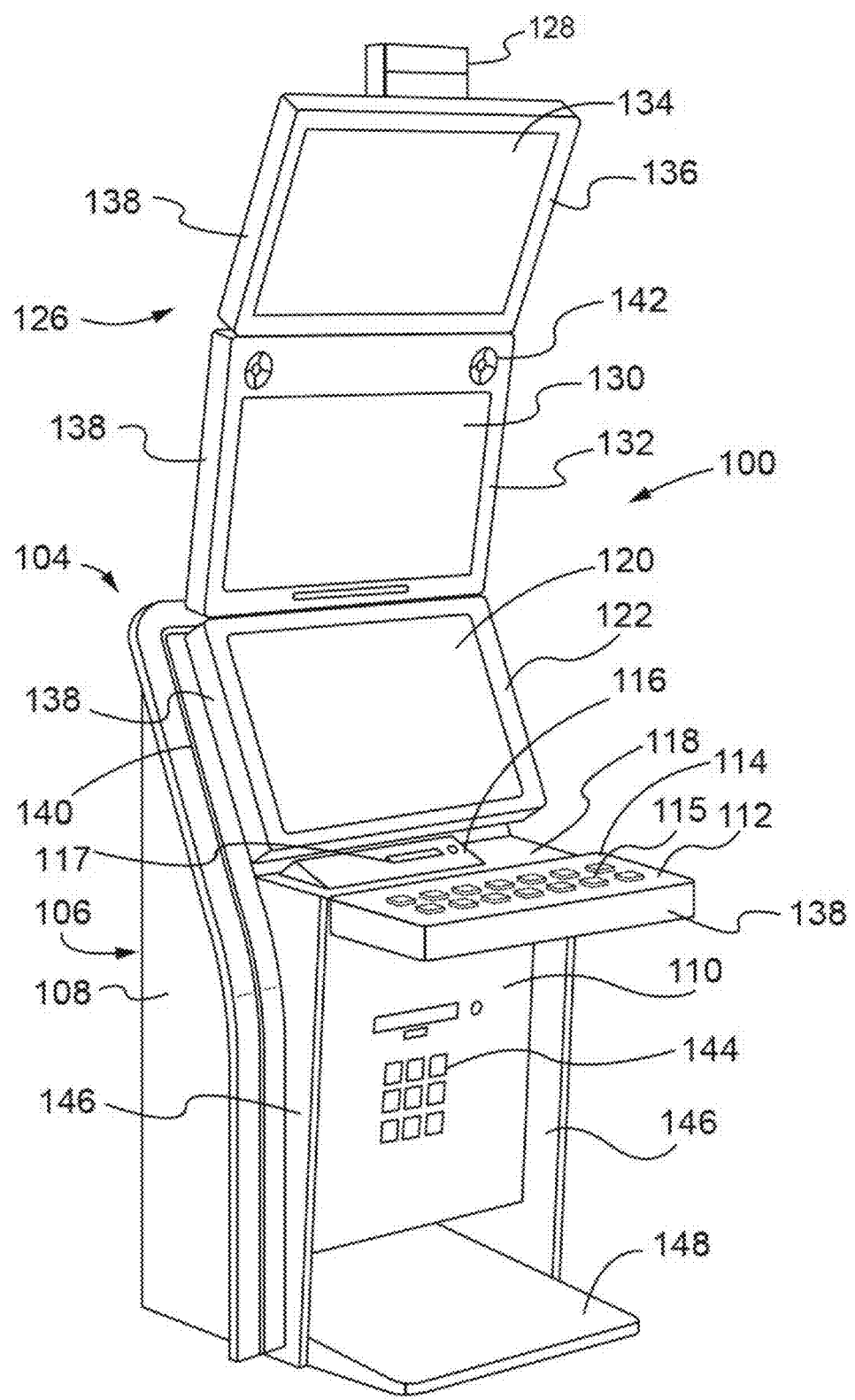
FIG. 1 shows a perspective view illustrating an example gaming system in accordance with aspects of the present disclosure.

FIG. 1 shows a perspective view illustrating an example of gaming system 100 in accordance with aspects of the present disclosure. The gaming system 100 may be referred to as a slot machine and, as illustrated, is housed in a cabinet 104 (e.g., a housing). The cabinet 104 may function to securely protect local control system, technology components, and provide support for display device(s) and player input and output interactions with the gaming system 100, such as describe herein below. In implementations, the cabinet is structured and configured such that a player can operate and play the gaming system 100 while standing or sitting.

The cabinet 104 can include a lower cabinet body portion 106, which includes a pair of cabinet side panels 108 (only one of which is viewable in the perspective view of FIG. 1), a front panel 110, and a rear panel (not shown). Additionally, the gaming system 100 can include a base panel (not shown) and a top panel surface (not shown) supporting a player interaction area 112 and a display device 120. The cabinet panels 108 and 110 (as well as the base panel and the top panel surface) may be interconnected along their edges and cooperate to form the cabinet 104, which encloses and houses components of the gaming system 100, as can be seen in FIG. 1.

While the example cabinet 104 is depicted as having a particular shape, structure, and organization, it should be appreciated that a wide variety of cabinet enclosure sizes, shapes, and designs are possible for the gaming system 100. For example, the cabinet panels 108 and 110 (as well as the base panel and the top panel surface) may be combined into fewer elements or divided into additional elements. Additionally, the positions of the display devices (e.g., first display device 120) and input/output devices can be reorganized and/or relocated with respect to one another.

The player interaction area 112 can include various input and output (I/O) devices through which a player can interact with the gaming system 100 in various ways to direct the wagering and game play activities and preferences. In some implementations, the player interaction area 112 may be a planar structure (e.g., a shelf or table-like structure) supported on the front top side of cabinet 104 on a panel structure that extends horizontally outwardly from the cabinet 104 in the direction of the player. The player interaction area 112 may contain player input and output structures, including a player control area 114, a player value acceptor and dispenser area 116, and player convenience input area 118.

The player control area 114 includes one or more player input devices 115 through with which players may interact with the gaming system 100 so as to direct game play. The player input devices 115 may include various player controls devices, such a keyboard, a keypad, a touchscreen displays, a voice input/recognition device, a button, a switched, a knobs, etc. For example, player input devices 115 may include game selection button(s) (e.g., in implementations where more than one game is provided in a single gaming system 100); gaming denomination value selection buttons (e.g., in implementations where one or more wagering denomination value is accommodated); wager selection buttons (e.g., in implementations involving where a selection of wager values are offered); pay line selection buttons (e.g., in game implementations that enable selection of multiple pay lines); a reel spin button (e.g., in implementations where a player initiate one or more reels to spin in a game); a repeat last bet button (e.g., for conveniently repeating a last game's preference and wager selections in a new game); a cash-out button (e.g., for player extraction of gaming system credits); an attendant call button; and gaming system information buttons (e.g., for selectively displaying pay tables, game rules, or other game-related information).

Although the gaming system 100 illustrated in FIG. 1 shows the player input devices 115 of the player control area 114 as physical controls (e.g., buttons), it is understood that in some implementations, a player's gaming control interactions could be made by either the physical controls or functionally equivalent "soft" controls (e.g., soft buttons) located on the gaming display device and activated by player touch (e.g., touch screen interfaces), or a combination of both arrangements.

The player value acceptor and dispenser area 116 may include one or more value acceptance and distribution devices 117 that enable the player to interact with the gaming system 100 and to risk or otherwise place a wager (a monetary value) on one or more outcomes of a game. For example, using the value acceptance and value distribution devices 117, a player can supply monetary value to the gaming system 100. Additionally, the value acceptance and distribution devices 117 may return winnings to the player via some form of value distribution.

In some implementations, the value acceptance and distribution devices 117 may accept any one or more of the following from a player to establish a gaming credit balance: coins, bills, tokens, tickets/vouchers, player ID cards, credit cards, or other suitable forms of value. Thus, if the gaming system 100 accepts coins and bills, the value acceptance and distribution devices 117 may comprise a currency bill validator and a coin validator. Likewise, if the gaming system 100 accepts tickets, the value acceptance and distribution devices 117 may comprise a ticket acceptor that receives tickets or vouchers representing some monetary value. The ticket acceptor may include a bar code reader, or other appropriate code reader, for reading the encoded value contained by the player's ticket or voucher. In some implementations, value acceptance and distribution devices 117 can accept more than one type of value. In some implementations, the player value acceptor and dispenser area 116 may include multiple different value acceptance and distribution devices 117 that accept different types of value from players.

Upon receipt of some type of value from the player, the value acceptance and distribution devices 117 of the player value acceptor and dispenser area 116 can perform validation on the player supplied value using appropriate hardware readers (e.g., determining that the currency bills/coins/tokens are genuine or the ticket/voucher is genuine). If the validation result is positive on player supplied value, the value acceptance and distribution devices 117 can generate a signal to a processor of the gaming system 100 that establishes a gaming credit balance for playing one or more games on gaming system 100.

In some implementations, the value acceptance and distribution devices 117 dispenses a monetary value, or a representation thereof, from the gaming system 100 when a player chooses to "cash out" the gaming credit balance (e.g., remove value from the gaming system 100). The player can cash out at any suitable time. When a player cashes out the value contained on a credit meter (not shown) of gaming system 100, a processor of gaming system 100 may cause a printer included in the value acceptance and distribution devices 117 to print and dispense a coded ticket or voucher through a dispensing slot to the player. The coded ticket or voucher may be a bar-coded ticket or any other code (e.g., PDF417 coding or quick response (QR) coding). This ticket can then be used as value input at another gaming system, or converted to currency at a conveniently located kiosk or cashier counter located near the gaming system. Alternatively, the processor of gaming system 100 may cause a currency bill dispenser or a coin dispenser included in the value acceptance and distribution devices 117 to dispense the value contained on the credit meter of gaming system 100.

Various combinations of the above value acceptance and value distribution arrangements are possible. The gaming system 100 may include other value acceptance and value distribution mechanisms in the player value acceptor and dispenser area 116. For example, the value acceptance and distribution devices 117 may include a magnetic strip or chip card reader/writer 227 in order to accept value from and transfer value to a magnetic strip or an embedded chip card. In other implementations, the value acceptance and distribution devices 117 may include hardware for transferring (and receiving) non-traditional currencies to players such as digital currencies (e.g., bitcoin).

In some implementations, the value acceptance and distribution devices 117 may include a card reader/writer 227 that accepts and reads any of a variety of magnetic strip or imbedded chip smart cards that convey machine readable information. The card reader/writer 227 reads inserted cards, in the case of wagering, for the credit information of the player for cashless gaming. The card reader/writer 227 may, for player loyalty programs, utilize the information on the card to identify the player account associated with the card so the gaming activity on the gaming system 100 may be associated with the player account. Additionally, a numeric or alphanumeric keypad (not shown) may be provided adjoining to the card reader/writer 227 slot that enables player entry of a personal identification number or the like for secure access to card information.

In some implementations, a player convenience input area 118 may be included in the gaming system 100, as is shown in FIG. 1. In various implementations, player convenience input area 118 may have a variety of features and functions depending on the jurisdictional deployment of the gaming system 100. In some implementations, the player convenience input area 118 may house a magnetic strip card reader (not illustrated), integrated circuit chip card reader (not illustrated), or both, for reading cards associated with a player loyalty program. Player loyalty programs, also referred to as player tracking systems, provide magnetic strip or chip cards to players for insertion into the gaming system 100 during play. These player loyalty/player tracking cards may be associated with a player account and are utilized by the card-issuing entity to monitor, or track a player's gaming activity and build loyalty through player rewards of a variety of types. The player convenience input area 118 may include an input mechanism such as input buttons so that a player may input a personal identification number or other require player information associated with the player tracking card. Further, the input mechanism may also include a small display device utilized to communicate player information to the player such as the player's current loyalty rewards.

In certain implementations, the player convenience input area 118 may include player convenience features such as a pocket for storage that allows players to store their personal items such as a mobile phone. The gaming system 100 may include one or more universal serial bus (USB) ports that enables a player to charge their electronics or connect to services such as the Internet or food service. Further, player convenience input area 118 of the gaming system 100 may include buttons to request food or drink service if the gaming system is located in an establishment that has food and drink service. The gaming system 100 may be connected to a local or wide area network such that selection of the requested food or drink service may alert the establishment's hospitality staff to deliver the requested service directly to the gaming system 100.

The layout of the player control area 114, the player value acceptor and dispenser area 116, and the player convenience input area 118 in gaming system 100 may be arranged differently than those disclosed and illustrated herein. The selections and arrangement of input locations on the cabinet 104 may vary based on the game buttons, the type of value wagered, and the player conveniences utilized in the deployment configuration of gaming system 100.

With continuing reference to FIG. 1, the lower cabinet body portion 106 supports the display device 120 in some implementations consistent with the present disclosure. For example, the display device 120 can be mounted atop or flush with a top panel surface of the lower cabinet body portion 106.

The display device 120 can use any current display technology, such as a cathode-ray tube (CRT) technology, liquid crystal display (LCD) technology, or light-emitting diode (LED) technology. For example, the display device 120 can be a 27-inch LCD display device mounted vertically (e.g., portrait orientation) or horizontally (e.g., landscape orientation) with respect to its long axis. Further, the display device 120 can be mounted within and framed by first display device frame 122 which is, in turn, mounted upon lower cabinet body portion's 106 top panel surface. In this manner, the display device 120 is both surrounded and secured within the first display device frame 122 and raised above the cabinet's top panel surface. In some implementations, display device 120 may be fitted with a transparent touch sensitive overlay for sensing player touch inputs into the gaming system 100. The touch sensitive overlays can communicate with a processor of gaming system 100 to enable the player to interact with the game.

In some implementations, the display device 120 may be the sole display provided by the gaming system 100. For example, a single first display device 120 may span the one or more portions of the cabinet 104 (e.g., lower body cabinet portion 106 and upper body cabinet body portion 126, described below) in place of other display devices (e.g., display devices 130 and 134, described below).

Dependent upon the particular gaming system housing style, a variety of other display devices and display technologies may be utilized in combination with display device 120. For example, the gaming system 100 may have one or more display devices in addition to the display device 120. For example, the cabinet 104 may support a player tracking device having a player tracking display device which displays various information to the player regarding the player's status. The cabinet 104 may also support other game-related display devices such as the wager display device and the gaming credit balance display device. These additional game-related display devices may be separate display devices or may be displayed on any one or more of the display devices (e.g., display device 120, or display devices 130 and 134, described below).

The lower cabinet body portion 106 can be further constructed to support the upper cabinet body portion 126. The upper cabinet body portion 126 may be comprised of an upwardly extending support structure (not illustrated) that extends from the rear side of lower cabinet body portion 106 configured to mechanically support a cabinet top light 128 and one or more additional display devices 130 and 134. Further, the upper cabinet portion support structure may conceal power and communication lines between (1) the control systems and components located within the lower cabinet body portion 106 and (2) the display devices mounted on the upper cabinet body portion 126 support structure.

In some implementations, the cabinet top light 128 can be mounted at a topmost end of the support structure of the upper cabinet portion 106, the cabinet top light 128 may be provided. The cabinet top light 128 may be capable of illumination in a variety of colors and is utilized to indicate and communicate conditions of the gaming system 100 to gaming players and service personnel.

In some implementations, the additional display devices 130 and 134 can be disposed generally in a vertical relationship and generally in alignment with the display device 120. The display devices 130 and 134 can be the same or similar to the display device 120 described above. Further, like the display device 120, the second display devices 130 and 134 can be mounted within and framed by second display device frame 132 and third display device frame 136, respectively. The second display device frame 132 and the third display device frame 136 can be attached to the upper cabinet support structure and can protect the second display device 130 and the third display device 134.

In some implementations, the display device 120, 130, and 134 can be disposed at an angle from each other to form a player-facing concave arc. However, in some implementations, the angles between the display devices 120, 130, and 134 may be adjustable and may be smaller or greater than the angles illustrated in FIG. 1. Further, it is understood that in some implementations the displays may be disposed in a common plane relative to each other. In some implementations, the curved display devices may be used for any or all of the display devices 120, 130, and 134. Similarly, any of the display devices used for gaming system 100 can be based on flexible display technologies. For example, it is possible to utilize flexible display technologies to create uniquely shaped curving, wavy, or tubular display structures to provide one or more of the display devices 120, 130, and 134. Additionally, in some implementations flexible display technologies can be used in combination with fixed flat screen technologies.

While the display devices 120, 130, and 134 have been described as implemented with video technologies, in some implementations, mechanical display devices (e.g., reels or wheels) with segments containing game indicia and step motor controllers may be employed to provide game information to a player. In some implementations, the segments may include printed symbols. In another implementation, the mechanical display devices may include flexible video display technology as the reel strips on mechanical reels. Thus, games implemented in video form can readily be implemented with mechanical display devices utilizing such display technology. Alternatively, in other implementations mechanical display devices with segments having fixed symbols could be used to implement the game.

The gaming system 100 may also include cabinet lighting design functions to attract players. In the example gaming system 100 illustrated in FIG. 1, attractive cabinet lighting is provided by frame accent lighting 138. It is noted that frame accent lighting 138 is a common structure found on the first display device frame 122, the second display device frame 132, and the third display device frame 136 and player interaction area 112. Example areas where frame accent lighting is applied to the gaming system 100 are commonly designated as frame accent lighting 138.

Frame accent lighting 138 may have multiple components. The side edge pieces of first display device frame 122, second display device frame 132, third display device frame 136, and the edge structure of player interaction area 112 can be made of a translucent or transparent plastic or other suitable materials. Linear arrays, or strips, of light emitting diodes (LEDs) (not shown) on circuit boards may be mounted below the translucent or transparent plastic side edge pieces 138. In some implementations, the circuit boards are flexible circuit boards. These LED strips and transparent or translucent coverings may surround one or more gaming system display device frames, as well as the player interaction area, to highlight these areas.

In some implementations, the individual LEDs mounted on the LED strips are of a type that can emit red, green, and blue light. In an alternative implementation, separate LEDs are used for the light colors. All LED strips can be electrically connected and can be controlled by a cabinet lighting controller (e.g., cabinet lighting controller 218 in FIG. 2) in conjunction with a processor of the gaming system 100 to selectively mix the emitted light colors in a manner to create any color. The cabinet lighting controller can flash and vary lighting as desired. For example, cabinet edge lighting can change and flash in combination with music rhythms or in combination with game events. Other variations are possible.

In some implementations, cabinet 104 may include LED strip lighting or LED rope lighting to accentuate the cabinet and enhance the attractiveness of the gaming system 100 to players. LED rope lighting is a number of small light-emitting diode bulbs linked together and encased in a plastic, polyvinylchloride, or other suitable material to create a string of lights. For example, in one implementation illustrated in FIG. 1, cabinet 104 includes cabinet accent lighting 140. In some implementations, cabinet accent lighting 140 is LED rope lighting mounted flush with the front side edge of the cabinet side panels 108. The LED rope lighting can generate any suitable colors, and are controlled by cabinet lighting controller and a processor of gaming system 100 to selectively mix the emitted light colors in a manner to create any color in the same manner as the frame edge lighting.

In some implementations, gaming system 100 includes one or more audio speakers 142 and appropriate driving electronics and sound cards so that game players may experience pleasing audio aspects of the gaming system 100. Audio is desirable to attract and maintain player interest in gaming system 100. The gaming system 100 may also emit attraction sounds during any idle period of gaming system 100. Game audio may add to the player's enjoyment of gaming system 100 by providing music and sound effects designed to enhance and compliment the gaming experience. In FIG. 1, the audio speakers 142 are shown mounted on the upper corners of second display device frame 132. Any suitable number of additional speakers 142 may be provided on additional display device frames or on the lower cabinet body portion 106 as desired.

The speakers 142 designed for emitting bass vibrations may be included in some implementations. Placement of the speakers 142 may be selected to enhance the sound emitting characteristics of the gaming system 100. For example, bass speakers or additional speakers 144 may be mounted inside lower cabinet body portion 106. Further, it is envisioned that in some implementations sound processing such as multi-channel processing and surround sound processing are included in gaming system 100. Audio jacks for attachment of player headphones may also be provided in some implementations of gaming system 100 for the player to further enhance the audio experience of the game and also to block out noise from other gaming systems.

In some implementations, the front panel 110 of lower cabinet body portion 106 includes a locked removable panel or locked door (not shown), which can be opened for access to internal control system and technology components that are housed within lower cabinet body portion 106 (discussed hereinbelow with respect to FIG. 2). The front panel 110 may be flanked on vertical sides by cabinet side panel extensions 146 which serve to define a space below player interaction area 112 for players to place their feet and legs while they are playing the gaming system 100 in a seated position. Foot rest 148, which may be cushioned, is provided below player interaction area 112 to enhance a player's ergonomic comfort while playing the gaming system 100. In some implementations, the edges of player interaction area 112 may be ergonomically cushioned as well.

While FIG. 1 illustrates an example of gaming system 100 having a particular form and layout, it is understood that the gaming system 100 may be embodied in alternative gaming system housing forms and layouts. For example, in some implementations the gaming system 100 may be disposed in a housing style referred to as a "slant top" gaming system that is designed to be operated with the player comfortably seated. In this arrangement, generally, the display device(s) and all player I/O controls are located on a low, wide, surface that extends forwardly from the player on a horizontal plane and then slopes upwardly and away from the player's seated location.

Additionally, in some implementations, housing styles of cabinet 104 of gaming system 100 may include bar top or table top housing arrangements. These housings are generally small enough to be placed on top of an existing bar or table while providing the requisite gaming system housing functions of protection of/access to gaming electronics, display devices, and player I/O functions described above.

In some implementations, cabinet 104 may also be an embedded housing. Embedded housings are built into structures designed to otherwise function as bars or tables in a gaming environment. Display devices may be integral with the bar top or table top surface or the entire unit may be contained below a transparent bar or table top surface while controls are disposed on the lower front or side of the bar or table.

Further, in implementations, the gaming system 100 may have fewer or greater numbers of display devices 120, 130, 134 that display the game and game-related information to the player. If multiple display devices are used, the display devices may be of similar size, shape, and orientation or the display devices may be divergent from each other in one or more of their respective descriptive characteristics. The one or more display devices can be supported by, mounted upon, or housed within a cabinet 104 which can comprise a variety of shapes, sizes, and forms. If a single display device 120 is used, such device may encompass the structure and function of the other display devices 130 and 134. For example, the display device 120 can be a single unit spanning the lower cabinet body portion 106 and the upper cabinet body portion 126 of the gaming system 100.

Figure 2:
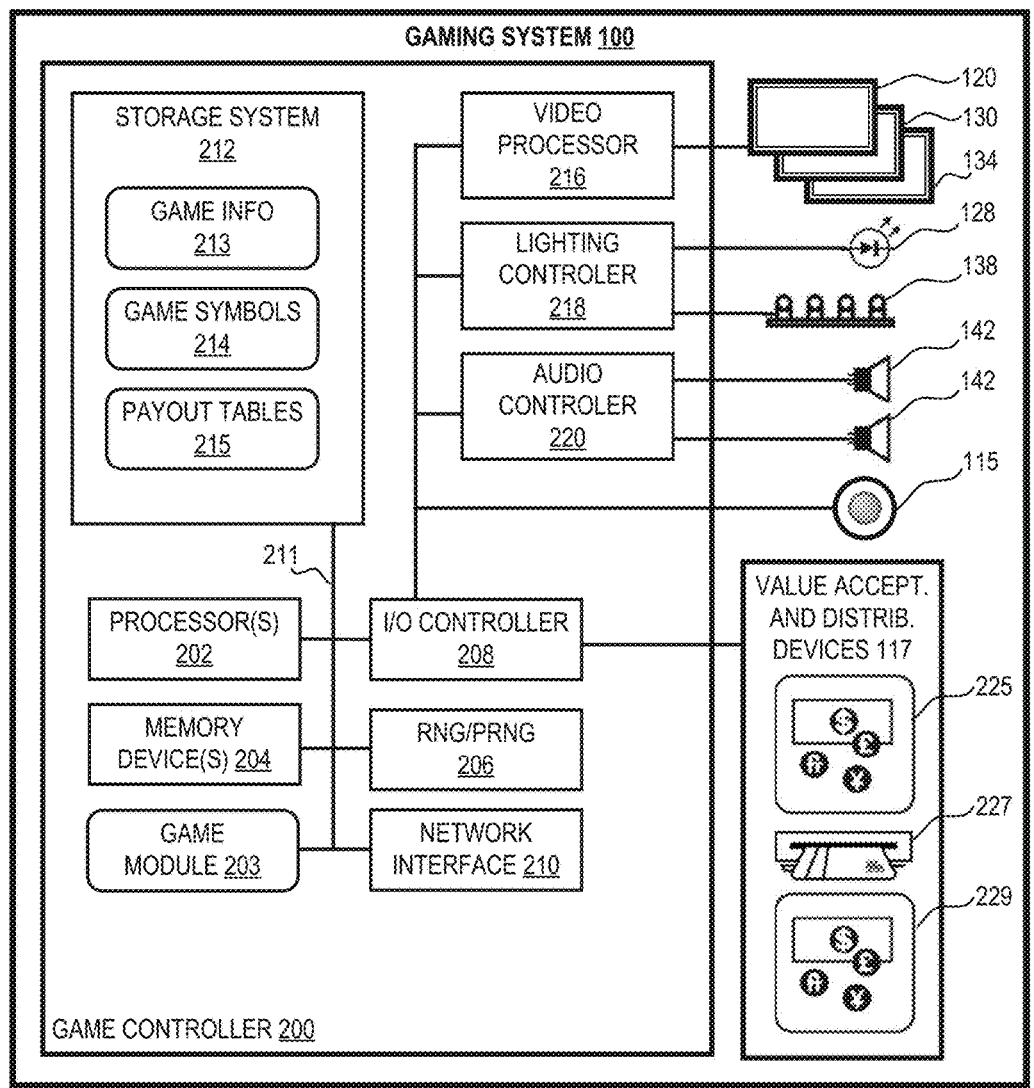
FIG. 2 shows a functional block diagram illustrating an example of a game controller of a gaming system in accordance with aspects of the present disclosure.

FIG. 2 shows a functional block diagram illustrating an example of a game controller 200 that controls a gaming system 100 in accordance with aspects of the present disclosure. The gaming system 100 can include a cabinet 104, one or more player input devices 115, one or more value acceptance and distribution devices 117, one or more display devices 120, 130, and 134, a cabinet top light 128, accent lighting 138, and one or more audio speakers 142, which can be the same or similar to that previously described herein.

In accordance with aspects of the present disclosure, the game controller 200 includes hardware and software configured to perform specialized game processes and functions, as described herein. In some implementations, the game controller 200 is specially configured for the purpose of performing game processes and functions. The hardware and software elements shown in FIG. 2 cooperate, on a broad and general level, to function as specialized gaming system. Implementations of the game controller 200 includes one or more processors 202, one or more memory devices 204 (e.g., random access memory and read only memory), a random number generator 206, an I/O controller 208, a network interface 210, and a storage system 212. Additionally, the game controller 200 includes at least one communication channel 211 (e.g., a data bus) by which the processor 202 is operatively and communicatively coupled to the memory device 204, the random number generator 206, the I/O controller 208, the network interface 210, and the storage system 212.

The memory device 204 can include a local memory (e.g., a random-access memory and a cache memory) employed during execution of program instructions. In some implementations, the memory device 204 includes one or more memory structures for storing instructions and various types of game data. The memory structures include one or more random access memory units (RAMs) units, one or more read only memory units (ROMs), one or more flash memory units including solid state drives (SSDs), one or more electrically erasable/programmable read only memory units (EEPROMs). In some implementations, communication with the memory device 204 by the processor 202 or a controller, encompasses the processor or controller accessing the memory device 204, exchanging data with the memory device 204, or storing data to the memory device 204.

The storage system 212 can comprise a computer-readable hardware storage device that stores information and program instructions. For example, the storage system 212 can be one or more flash drives and/or hard disk drives. In accordance with aspects of the present disclosure, the storage system 212 can include, for example, game information 213, game symbols 214, and payout tables 215. The game information 213 can be information that is obtained and updated during the play of a game. For example, the game information may include a player identification, player demographic information, player account information, player tracking information, and game credit information. The game symbols 214 can be one or more sets of symbols that may be selected and displayed in a display device during play of a game. The individual sets of symbols in the game symbols 214 may include a number of symbols. The sets of symbols can be associated with the same or different symbols. In implementations, the sets of symbols may include numbers, letters, geometric figures, symbols, images, character, blank symbols (e.g., the absence of symbols), animations, transparent symbols (e.g., symbols that permits underlying symbols to be visible), or any other suitable graphical depiction. The symbols in the set of symbols may include pay symbols and special or designated symbols (e.g., trigger symbols and bonus symbols). The pay tables 215 may be one or more tables that map predefined winning symbols (e.g., "Instant Win") or winning combinations of symbols (e.g., 7-7-7) in the game symbols 214 with predetermined payouts or other awards.

The network interface 210 can be configured to communicate with external devices through a communication network (e.g., a peer-to-peer network, a local area network, a wide area network, or the Internet). The network interface 210 can be a digital circuit board or card installed in game controller 200 to provide network communications with the external devices. For example, the game controller 200 may use the network interface 210 communicate with one or more central servers, controllers, or remote devices to execute games, establish credit balances, participate in jackpots, etc.

The processor 202 can be a microprocessor, microchip, or application-specific integrated circuit. In some implementations, the processor 202 is specially configured with arithmetic logic units and math co-processors (e.g., floating point units) for executing the game consistent with the various implementations disclosed herein. In some implementations, the processor 202 includes registers for holding instructions or other data, and cache memory for storing data for faster operation thereupon. In some implementations, the processor 202 may be a multi-core processor that includes two or more processors for enhanced performance, more efficient parallel processing, or other advantageous computing functions.

The processor 202 executes computer program instructions (e.g., an operating system and/or gaming applications), which can be stored in the memory device 204 and/or storage system 212. For example, the processor 202 can execute a game module 203. The gaming module 203 may include program instructions and operation data that configure and control the game controller 200 to provide gaming functions and features described hereinbelow. For example, the program instructions can include gaming system initialization software, system basic input and output software, operating system software, value acceptor software, value dispenser software, display image generation software, game symbol set image generation software, game rule execution software, game data set(s), random number generation software, system driver software, system data bus management software, audio generation and speaker driver software, and video generation and display driver software, and other software routines for operation of the game controller 200. Additionally, the operation data can include, for example, game image data, game rule data, pay table data, game mode and timing data, gaming value and wager parameter data, and random or pseudo-random number generation data.

While the game module 203 is described as a single unit, it is understood that the functionality of the gaming module can be divided among a number of different units. Additionally, while the game module 203 is shown in FIG. 2 as residing in the game controller 200, it is understood that the game module 203 may be stored in the storage system 212. In addition, in some implementations, the gaming module 203 can be stored in a distributed manner such that some code is stored in memory device 204 and other code is stored remotely from the game controller 200. For example, part or all of the code and operational data for operation of the gaming system or for execution of the game features may be stored in a remote memory structure and be downloaded to the memory device 204 via a network connection.

In accordance with aspects of the present disclosure, the I/O controller 208 comprises hardware, software, or a combination of hardware and software that receives and processes player inputs from various input devices (e.g., input device 115), and that communicates outputs of the game control to the player via output devices display devices (e.g., display devices 120, 130, and 134), lighting devices (e.g., top light 128 and accent lights 138) and audio devices (e.g., audio speakers 142). The I/O controller 208 may also function as the intermediary between the processor 202 and one or more output devices to control information and data flow therebetween. The I/O controller 208 is configured to understand the communication and operational details (e.g., hardware addresses) for the attached player input device 115, the value acceptance and distribution devices 117, video processor 216, lighting controller 218, and audio controller 220. In this manner, processor 202 may be freed from the operational details of the peripheral I/O devices. For example, in some implementations where an input or output device is changed or upgraded, the I/O controller 208 can be changed without changing other gaming system components.

In accordance with aspects of the present disclosure, the random number generator (RNG) 206 comprises hardware, software, or a combination of hardware and software that generates random numbers or pseudo-random numbers. The RNG 206 generates random numbers for use by the gaming software during game execution. In some implementations, random numbers are utilized by game software for the random selection of one or more game symbols from a set of game symbols during a game. In some implementations, the RNG 206 is a software module configured to be executed by the processor 202 for the generation of a true random or pseudo-random number. The code for RNG 206 may be stored in the memory device 204. In some implementations, the RNG 206 is a hardware based random number generator. As noted above, the gaming system may rely on random generation performed by a pseudo RNG, a true RNG, or hardware RNG specifically designed for gaming systems that are in communication with processor 202. In some implementations, the hardware based random number generator may be incorporated into the processor 202 or can be separate from the processor 202. Also, in some implementations, the RNG 206 may be located remotely from the gaming system 100 and the controller 200 and provides random values to the gaming system via a communication link. For example, the controller 200 may receive random numbers from a remote server via network interface 210.

The value acceptance and distribution devices 117 can include a value acceptor 225, a card reader/writer 227, and a value dispenser 229. The value acceptor 225 is a device that reads, validates, and communicate the amount of the inserted value to the processor 202. In some implementations, the value acceptor 225 could include magnetic strip or chip card readers to accept and transfer value. The value acceptor 225 may also be configured to accept and transfer non-traditional currencies such as digital currencies. In implementations, I/O controller 206, the processor 202, or both contain appropriate control instructions to communicate and extract value from the inserted item containing value. In some implementations, use of a magnetic strip or embedded chip card, for example a bank card, for value insertion requires the processor 202 to communicate, via network interface 210 (described below), with devices external to a gaming system.

The card reader/writer 227 is a device that reads and writes information to and from data cards, such as player loyalty cards. For example, card reader/writer 227 can extract account identifying information from the card and utilizes this information to access the associated account information stored remotely via network interface 210. In implementations where player loyalty/player tracking systems are employed, a player's loyalty account and record of gaming activity can be stored in a networked storage location or database. The processor 202 is configured to record the player's gaming activity in memory device 204 during the duration of loyalty card insertion. When the loyalty card is removed from card reader/writer 227, recorded gaming activity is uploaded, via network interface 210, to the remote storage location associated with the player's account. In this manner, the player's gaming activity can be further processed and analyzed, and the player can be awarded loyalty rewards based upon his activity data.

The value dispenser 229 is a device that provides monetary funds to players in one or more forms. In some implementations, the player's credit value may be issued to the player via a printed and dispensed encoded paper ticket or token which the player can then exchange at a special purpose kiosk or cashier location for the monetary value encoded into the ticket or token. In some implementations, the processor 202 can direct the value dispenser 229 to issue to the player an appropriate amount of coin or bills directly to the player. Additionally, or alternatively, in some implementations, the player may have the option to electronically direct the credit value to an account associated with the player.

Still referring to FIG. 2, the game controller 200 also controls the function of input and output devices utilized by a gaming system 100. In various implementations, I/O controller 206 serves as an interface unit between processor 202 and some of the output devices, such as a video processor 216, a cabinet lighting controller 218, and an audio controller 220.

The video processor 216 can be hardware, software, a combination of hardware and software that communicates with processor 202 to render all game graphics, video displays, and information on one or more video display devices (e.g., display devices 120, 130, and 134). In some implementations, the video processor 216 includes one or more processors, controllers, and/or graphics cards for processing the game images, outcomes, and animated displays and coordinating the processed data to be displayed between, among, or across any or all display devices. In various implementations, this may include being configured to simulate objects and the movement of objects which represent video reels containing sets of gaming symbols. It should be appreciated that in certain other implementations where physical mechanical reels are utilized by the gaming system 100 as display devices, reel controllers and stepper motors would be provided in lieu of or in addition to video processor 216.

The lighting controller 218 can be hardware, software, a combination of hardware and software that controls lighting devices of gaming system 100. In implementations which utilize cabinet lighting as described with respect to FIG. 1, a cabinet lighting controller 218 may be utilized to coordinate and control the color and timing of cabinet lighting displays with processor 202.

The audio controller 218 can be hardware, software, a combination of hardware and software that controls audio devices of gaming system 100. In certain implementations which utilize sound design, processor 202 may utilize audio controller 220 to coordinate and control the sound emissions. In some implementations, audio controller 220 may include one or more audio processing cards for generating sound and for driving the one, two or more audio speakers that may be included with a gaming system.

In some implementations, various additional features and functions are performed by the game controller 200. For example, the game controller 200 may be configured to track game play events that occur on a gaming system. In some implementations, the game controller 200 may audit all recorded monetary transactions, including all wager amounts, game outcomes, game winnings, and game payouts that occur through the value dispenser 229. Further, some implementations may include security software to assist in protecting the gaming system 100 from tamper or alteration attempts.

In some implementations, memory devices, such as memory device 204, with the software components and other data may be secured and authenticated by authentication software stored in an unalterable memory device within the housing of the game controller 200. The game controller 200 may also include application specific integrated circuits (ASICs) to perform the security and authentication functions. At any appropriate time, such as before each play of a game, at a predetermined interval, upon transfer of any game data or any software components from a mass storage to the memory device 204, or upon demand, the game controller 200 (using a processor such as processor 202 or a separate ASIC) may execute an authentication routine and perform an authentication of any software component or other data of the game controller 200. In some implementations, the gaming system software components may be prepared for authentication via creation and storage of an encrypted signature unique to one or more of the software components.

In some implementations, an encrypted signature may be created by utilizing a hash function on a software component or code to form a message digest (i.e., a hash of the software component) followed by a key encryption of the message digest to form an encrypted signature unique to the software component. In some implementations, the key encryption may be public key encryption, private key encryption, or any suitable key encryption schema. The encrypted signature may be stored with the gaming system software component, for example, in a mass storage device or an unalterable memory. During a software component authentication, the gaming system 100 executes one or more authentication routines utilizing the same hash function to operate on the software component to compute, or re-create, a new message digest for the software component. The new or re-created message digest may then be compared with a previously created message digest obtained by decrypting the stored encrypted signature. Matching message digests between the new and previously created message digests indicate that the software component is authentic and the game controller 200 may allow game play to proceed. However, when the message digests do not match, the game controller 200 may determine that the software component under authentication may be corrupted or fraudulent and game play may be halted. It should be appreciated that the game controller 200 may perform other suitable security and authentication checks on the game data or software components. Such authentication and security devices and functions are unique to gaming and casino industry to minimize or prevent fraud in gaming systems and gaming systems.

The gaming system 100 and game controller 200 shown in FIG. 2 provide non-limiting examples consistent with implementations of the present disclosure. It is understood that the functional elements and operations described in relation to FIG. 2 can be embodied in hardware, software, or a combination thereof. The described hardware includes the structures described and their functional or operational equivalents. The described functions may be performed by hardware, digital circuitry, computer software, computer firmware, or functionally equivalent combinations thereof.

Gaming System Operation

The flow diagrams in FIGS. 3A-3D illustrate functionality and operation of possible implementations of systems, devices, processes, and computer program products according to various implementations of the present disclosure. Each block in the flow diagrams of FIGS. 3A-3D can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A-3D. For example, two blocks shown in succession can be executed substantially concurrently, or the blocks can sometimes be executed in the reverse order, depending upon the functionality involved. Additionally, in some implementations, the blocks of the flow diagrams can be rearranged. Further, in some implementations, the flow diagram can include fewer blocks or additional blocks. It is also noted that each block of the flow diagrams and combinations of blocks in the flow diagrams can be implemented by special purpose hardware-based systems that perform the specified functions or acts, or combinations of special purpose hardware and computer instructions.

Figure 6A:
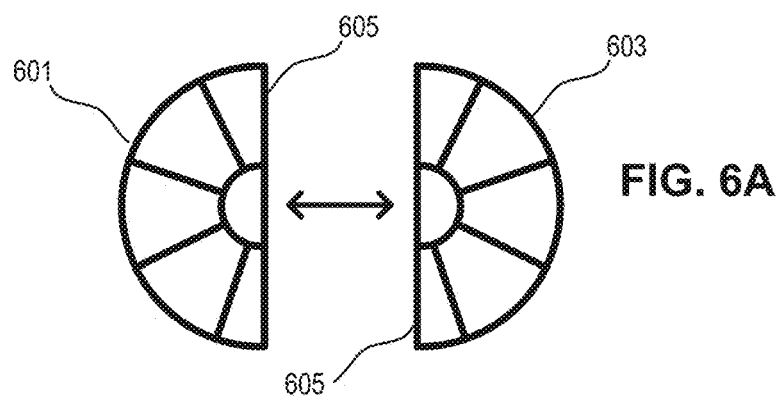
FIG. 6A shows a picture illustrating an example of complimentary partial symbols of a gaming system in a combinable orientation.
Figure 6B:
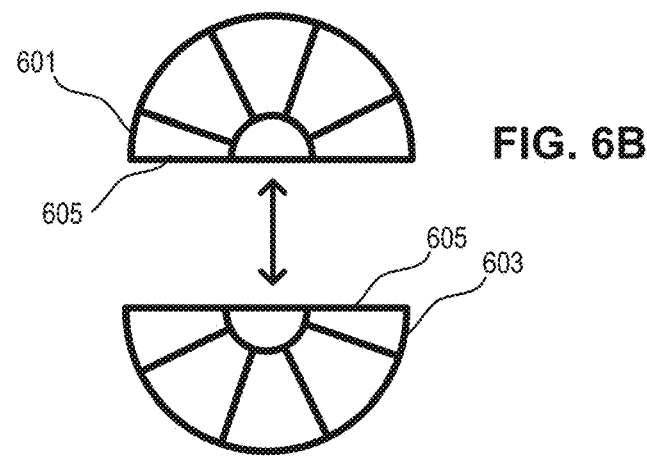
FIG. 6B shows a picture illustrating an example of complimentary partial symbols of a gaming system in a combinable orientation.
Figure 6C:
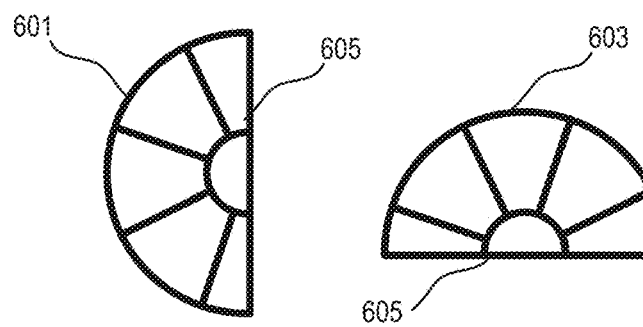
FIG. 6C shows a picture illustrating an example of complimentary partial symbols of a gaming system in a non-combinable orientation.
Figure 6D:
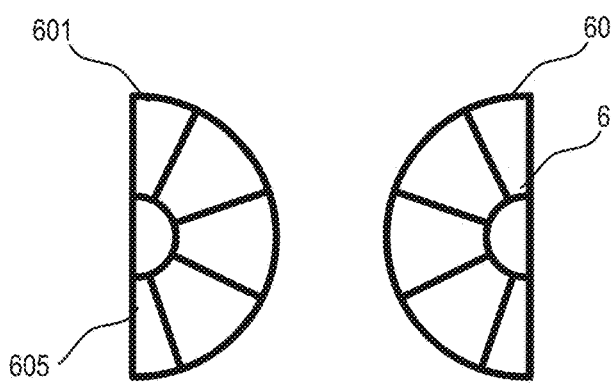
FIG. 6D shows a picture illustrating an example of complimentary partial symbols of a gaming system a non-combinable orientation.
Figure 7A:
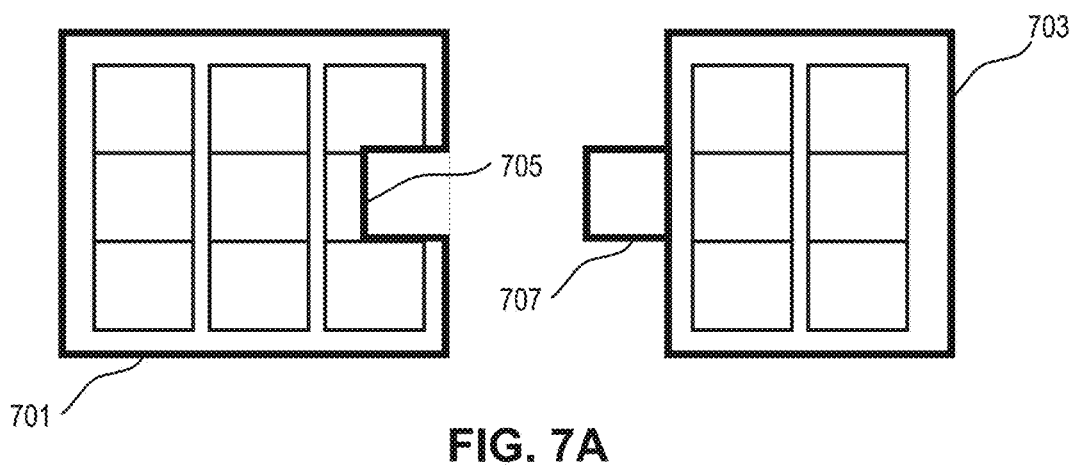
FIG. 7A shows a picture illustrating an example of complimentary partial symbols of a gaming system in a combinable orientation.

FIGS. 3A-3D show flow diagrams illustrating an example process 300 of operating the gaming system (e.g., gaming system 100) in accordance with aspects of the present disclosure. As described previously herein, a processor (e.g., processor 202) of a game controller (e.g., game controller 200) executes program instructions (e.g. game module 203) that control the gaming system to provide a game that may include several phases. In a first phase of the game, the gaming system randomly generates a plurality of game symbols from one or more sets of game symbols and displays the randomly generated symbols in a matrix of symbol display positions on a first game display. For example, the first game display can be a slot machine game in which five reels form a three-by-five matrix of symbol display positions (e.g., slot machine in game display area 400 of FIG. 4). The gaming system determines whether the first game display includes at least two complementary partial symbols (e.g., semi-circular symbols) aligned in adjoining matrix symbol display positions. For example, the complementary partial symbols can be aligned with one another when displayed in neighboring columns of the slot machine (e.g., reels) that lack any intervening symbol display positions between them. In some implementations, the partial symbols may have shapes that can only combine when displayed in certain orientations. In such implementations, the gaming system also determines whether the shapes of the aligned complimentary partial symbols are oriented with respect to one another so as to be combinable. For example, the partial symbols may include complimentary semi-circular shapes. (See, e.g., FIGS. 6A-6D.) In such example, the gaming system may determine whether the semi-circular shapes are displayed in adjoining symbol display locations and whether the flat sides of the semi-circles are oriented towards one another (such as shown in FIGS. 6A and 6B). In another example, the partial symbols may include rectangular shapes having one or more keyed sides. (See, e.g., FIGS. 7A-7C.) In such example, the gaming system may determine whether the semi-rectangular shapes are displayed in adjoining symbol display locations and whether the keyed sides are oriented towards one another (such as shown in FIG. 7A).

If the gaming system determines that the outcome of the first phase includes at least two complimentary partial symbols that aligned in adjoining symbol display positions and, in some implementations, that are combinably oriented, the gaming system combines such complimentary partial symbols to form a second game display and to trigger a second phase of the game. In some implementations, a type of the second phase of the game corresponds to the types of combined complimentary partial symbols. For example, in one implementation, if the complimentary partial symbols are semi-circular shapes (representing, e.g., parts of an award wheel display), then the game display of the second phase may be an award wheel-type game. In one implementation, if the complimentary partial symbols are rectangular shapes having one or more keyed sides, then the game display of the second phase may be another slot machine-type game.

It should be appreciated that although one or more game phases are disclosed herein, in various embodiments, a game does not require distinct phases, or any phases. That is, in some implementations, one or more phases of the game discussed herein may simply be features of the game without distinct phases.

It should be appreciated that any suitable partial symbol shape may be implemented and that the partial symbol shape may or may not be thematically related to the second phase that is played in the second game display created by the combined partial symbols.

Further, while the examples above describe the first phase of the game providing a single combination of complimentary partial symbols triggering a single second phase, it is understood that some implementations may provide more than one combination of complimentary partial symbols in the first phase. For example, the first phase of the game may produce an outcome in which two or more sets of complimentary semi-circular symbols combine to provide two or more second game displays and trigger two or more award wheel games in the second phase of the game. In alternative implementations, the first phase of the game may produce an outcome in which one set of complimentary semi-circular partial symbols may combine to provide a second game display area and trigger an award wheel game in the second phase of the game and another one set of complimentary partial rectangular shape having keyed side symbols may combine to provide a different second game display area and trigger a different a slot machine game in the second phase of the game.

In various implementations, the partial symbols may have different sizes in relation to a game display. For example, in a game display comprised of a rectangular matrix of symbol display areas (e.g., game display area 400 providing a slot machine including symbol display areas 410A-410O in FIG. 4A), the partial symbols may occupy one or more of the symbol display areas. For example, some partial symbols may occupy a single symbol display area (e.g., semi-rectangular partial symbol 425E at symbol display area 410N in FIG. 4A). Some partial symbols may span two symbol display areas (e.g., semi-circular partial symbol 425A spanning symbol display areas 410F and 410K in FIG. 4A). It should be appreciated that some implementations of the partial symbols could span three or more symbol display areas.

It should be appreciated that, when two or more combinations of complementary partial symbols are combined to form second game display areas and trigger the second phase of game play, the second phase may be executed simultaneously or may be sequentially executed in any order. In some implementations, the second game displays or second game display areas are presented within the game display area (e.g., second display area 445 presented within game display area 400 in FIG. 4C). In some implementations, the second game displays or second game display areas are outside of the game display.

In some implementations, if a second phase of the game is triggered, the gaming system may select a second plurality of symbols from one or more second sets of symbols associated with the second phase of the game and display the plurality of symbols on the second game display. In some implementations, the selected symbols can be associated with an award value. In some implementations, the selected symbols can be alternatively be associated with a triggering event. During play of the second phase of the game, the gaming system may randomly determine a symbol from the second plurality of symbols and highlight or indicate the selected symbol on the second symbol display. The gaming system may determine the award value associated with the randomly selected symbol and may conclude the second phase of the game by issuing the determined award to the player.

In some implementations, during the second phase of the game, the gaming system may display in the second game display area a game display comprising a rotating award wheel. Each segment of the award wheel has an associated award value. The gaming system rotates the award wheel before randomly stopping on a wheel segment indicating an award outcome. In the case where the randomly selected outcome is a monetary award, the gaming system may issue the monetary award by incrementing the player's credit balance. However, in some implementations, at least one award wheel segment may be associated with an award that comprises a trigger symbol which triggers a third phase of the game. In the case where the randomly selected outcome is a trigger symbol, the gaming system may initiate a third phase of the game using a third game display area. The game display of the third phase of the game may be, in some implementations, an additional award wheel game.

In some implementations, if a third phase of the game is triggered, the gaming system may select a plurality of symbols from a third set of symbols associated with the third phase of the game and display the plurality of symbols on the third game display. In some implementations, as noted above, additional game displays, like the third game display may appear in the game display area or in another separate game display area. In some implementations, the number of symbols selected from the third symbol set is greater than the number of symbols selected from the second symbol set during the second phase of the game. In some implementations, selected symbol from the third symbol set may be associated with an award value. In some implementations, the award values associated with symbols from the third symbol set may be greater than the values associated with the second symbol set during the second phase of the game. During play of the third phase of the game, the gaming system may randomly determine a symbol from the plurality of symbols and highlight or indicate the selected symbol on the third symbol display. The gaming system may determine the award value associated with the randomly selected symbol and may conclude the third phase of the game by issuing the determined award to the player.

The process 300 in FIGS. 3A-3D includes blocks 301 to blocks 383. In some implementations, a play of the game may encompass blocks 305-337 when only the first phase of the game is played. In some implementations, a play of the game may encompass blocks 305-357 when a play of the first phase of the game triggers a play of the second phase of the game. In some implementations, a play of the game may encompass blocks 305-371 when a play of the first phase of the game triggers a second phase of the game, and a play of the second phase of the game triggers a play of a third phase of the game. In other words, play of a game begins with a wager and activation of a play of the first phase of the game and the play of the game ends when the features of the first phase (e.g., a base phase of the game), a second phase (e.g., a bonus phase of the game), a third phase (e.g., an additional bonus game), or all three of such phases have completed, depending on whether the second phase and the third phase of game are triggered. In another implementation, one play of a game comprises blocks 311-335 or blocks 311-359, and terminating at either block 335 or block 359 depending on whether the gaming system triggers the second or third phases of the game. In some implementations, block 383 is not part of a play of a game. In alternative implementations, block 383 may be part of a play of a game.

More specifically, at block 301, the gaming system receives monetary value from a player via a value acceptor device (e.g., value acceptor 225). For example, the player can deposit currency into the value acceptor of the gaming system for game play. Alternatively, the player can deposit value by inserting an encoded paper ticket into the value acceptor for game play.

At block 303, the gaming system determines a credit balance based on the monetary value received from the player at block 301. For example, the gaming system can establish a credit balance for the player based on the communication from the value acceptor. The credits enable the player to initiate a play of a game and to also place wagers on the play of the game. The gaming system may provide a visual indication of the player's credit balance by controlling a display device to display the current balance (e.g., using one of displays devices 120, 130, and 134, the value acceptor 225, or the credit meter 405B of FIG. 4A).

At block 305, the gaming system receives a wager input for a play of a first phase of the game from the player. The wager input may include amount of a wager (e.g., an amount of currency or credits). For example, the player may communicate the amount of the wager input using a player input device (e.g., player input device 115 in player control area 114, or "Bet" button 405E in game display area 400). The amount of the wager may be a minimum wager, a maximum wager, or any other wager amount therebetween. In some implementations, the player's wager amount may determine the value of some of the available payouts. In some implementations, the gaming system may determine whether the player provided enough credits to enable the player's selected wager. The gaming system may also prevent the player from placing the wager and starting a play of a game if the player's credit balance is not large enough to support the player's selected wager. In such case, the gaming system may enable the player to insert additional value to obtain the minimum credit level or to cash out of the gaming system.

In some implementations, receiving a wager input at block 305 includes, at block 307, determining a number of active pay lines based on the amount of the wager. A pay line (e.g., pay lines 403A, 403B, and 403C in FIG. 4A) indicates combinations of symbols displayed in a game outcome that may pay an award. If a pay line is active (e.g., pay lines 403A and 403B in FIG. 4A, as indicated by active pay line indicators 437A and 437B), the gaming system pays an award for winning symbols or combinations of symbols along the active pay line. If a pay line is not active (e.g., pay line 403C in FIG. 4A, as indicated by inactive pay line indicator 437C), the gaming system does not pay an award for winning symbols or combinations of symbols along that pay line. It should be appreciated that the gaming system may utilize any type of suitable indicator to distinguish active pay lines from inactive pay lines. It should also be appreciated that in some implementations the gaming system may not indicate active pay lines. In some implementations, depending on the wager amount, the gaming system may enable the player to manually activate or select pay lines (e.g., using pay line selector button 405G in FIG. 4A). In some implementations, the gaming system automatically activates pay lines based on an amount of the player's wager. In some implementations, the gaming system may control one or more display devices (e.g., display device 120) to indicate the active pay lines (e.g., using pay line indicators 437 in FIG. 4A or by shading the display of symbology of the inactive pay line 403C).

At block 309, the gaming system updates the gaming credit balance determined at block 303 based on the wager input at block 305. For example, the gaming system deducts the amount of the wager from the gaming credit balance. It should be appreciated that credit balance updating could occur at other times during a game. For example, a single credit balance update could be performed at the end of a play of a game where the update both deducts the wager from the credit balance and adds any monetary awards to the credit balance.

At block 311, the gaming system initiates play of a first phase of the game. In some implementations, initiating play of the first phase may include the gaming system securely accessing game data (e.g., game module 203, game information 213, game symbols 214, and/or payout tables 215) from a memory device (e.g., storage system 212) and authenticating that such game data is valid prior to starting a play of a game. Additionally, in some implementations, initiating the play of the first phase of the game at block 311 includes, at block 313, receiving a request to initiate the play of the game via a player input device (e.g., one of player inputs 115 of the player control area 114). For example, the player may actuate a game start button, a spin button, or a lever on the gaming system to start spinning slot machine reels of the gaming system (or randomly generating symbols using other methods discussed above for virtual reels) for the play of the game. In some implementations, the first phase of the game is a slot machine game. It is understood that some implementations can use other types of games as the first phase of the game, including games without slot machine reels.

At block 315, the gaming system uses a random number generator (e.g., RNG 206) to randomly determine an outcome of the first phase from one or more sets of game symbols (e.g., symbol sets or game symbols 214). In one implementation of the first phase of the game, the gaming system includes a plurality of symbol display areas associated with a plurality of video-based slot machine reels. For example, the gaming system may include five video-based slot machine reels that are each associated with three symbol display areas. The gaming system may further include symbol sets that includes a plurality of symbols. Each symbol set can be associated with one of the slot machine reel. For a play of a game, for each slot machine reel, the gaming system may generate a plurality of symbols from the associated symbol sets for the symbol display areas of the reel. The gaming system evaluates the generated plurality of symbols for winning symbol combinations. The gaming system determines a payout amount based on winning symbol combinations along wagered pay lines and in accordance with a pay table.

In accordance with aspects of the present disclosure, the game symbols include full symbols and partial symbols. As used herein, the term "partial symbol" or "partial symbols" is used to represent a subset of symbols in the symbol set having complimentary shapes that may be the same or different from one another and that, when aligned in a predetermined relationship in the symbol display matrix, may combine to trigger a second phase of the game and form a new game display area (e.g., a second game display area for displaying an award wheel or additional slot machine reels). As a non-limiting example, the full symbols can include numbers, letters, geometric figures, symbols, images, character, animations, blank symbols (e.g., the absence of symbols), or any other suitable graphical depiction. In one implementation, partial symbols may include one or more complimentary geometric shapes, such as semi-circles (see, e.g., FIGS. 6A-6D) and interlocking rectangles or rectangular shapes having one or more keyed sides (see, e.g., FIG. 7A-7C). As previously described, some partial symbols may be a single symbol display area for a full symbol (e.g., semi-rectangular partial symbol 425E at symbol display area 410N in FIG. 4A), and some partial symbols may span more than one symbol display area (e.g., semi-circular partial symbol 425A spanning symbol display areas 410F and 410K in FIG. 4A). It is understood that any suitable symbol can be used as partial symbols (e.g., geometric shapes, numbers, letters, images, characters, etc.) so long as the partial symbols, when suitably aligned in a predetermined relationship in the symbol display matrix, may be combined to form a complete symbol.

In some implementations, at block 316, the gaming system randomly determines the orientations of the partial symbols determined at block 315. For example, the gaming system may randomly rotate the partial symbols in relation to one another so as to have different orientations, some of which are combinable. In some implementations, after displaying an outcome of the first phase including partial symbols, the gaming system can provide a display of the partial symbols rotating at their respective symbol display locations before stopping in a random orientation in relation to one another. In some implementations, the orientations of the partial symbols are always appropriate for combining partial symbols and the gaming system may not be require to determine the orientation of the partial symbols.

At block 317, the gaming system displays (e.g., using display device 120) the outcome determined at block 315 in symbol display positions of a first game display. In a non-limiting example, the first game display for the first phase can be a slot machine game (e.g., game display 400 in FIGS. 4A-4C) including a number of reels (e.g., reels 402A-402E in FIG. 4A) having symbol display positions (e.g., symbol display positions 410A-410O in FIG. 4A). Upon initiation of the first phase of the game at block 311, the gaming system may show the symbol display positions of the reels rotating before coming to a stop. Symbols 420A-420O displayed on reels 402A-402E illustrate the symbols randomly determined at block 315 after the reels have stopped rotating.

Figure 3A:
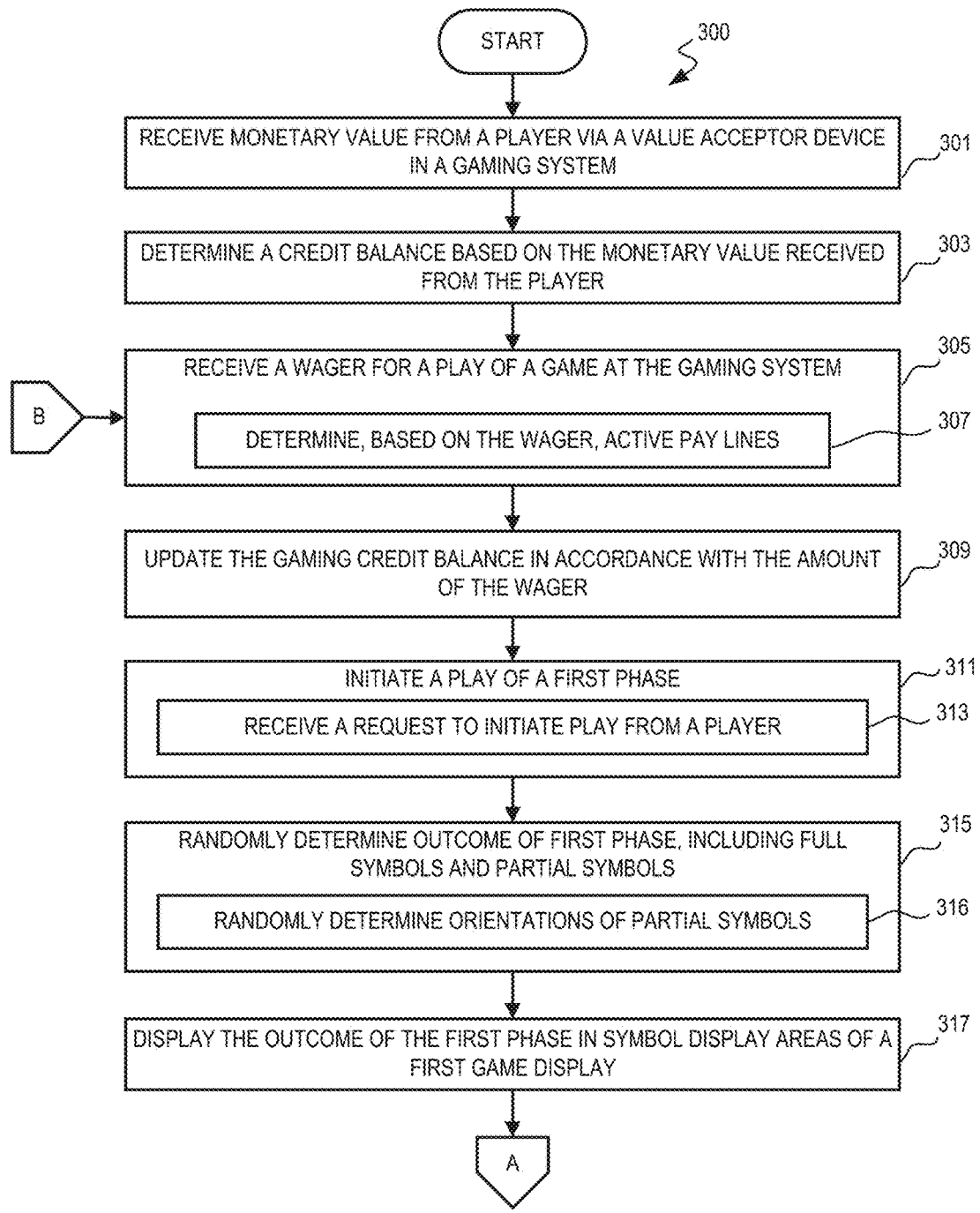
FIG. 3A shows a process flow diagram illustrating an example process of operating the gaming system in accordance with aspects of the present disclosure.
Figure 3B:
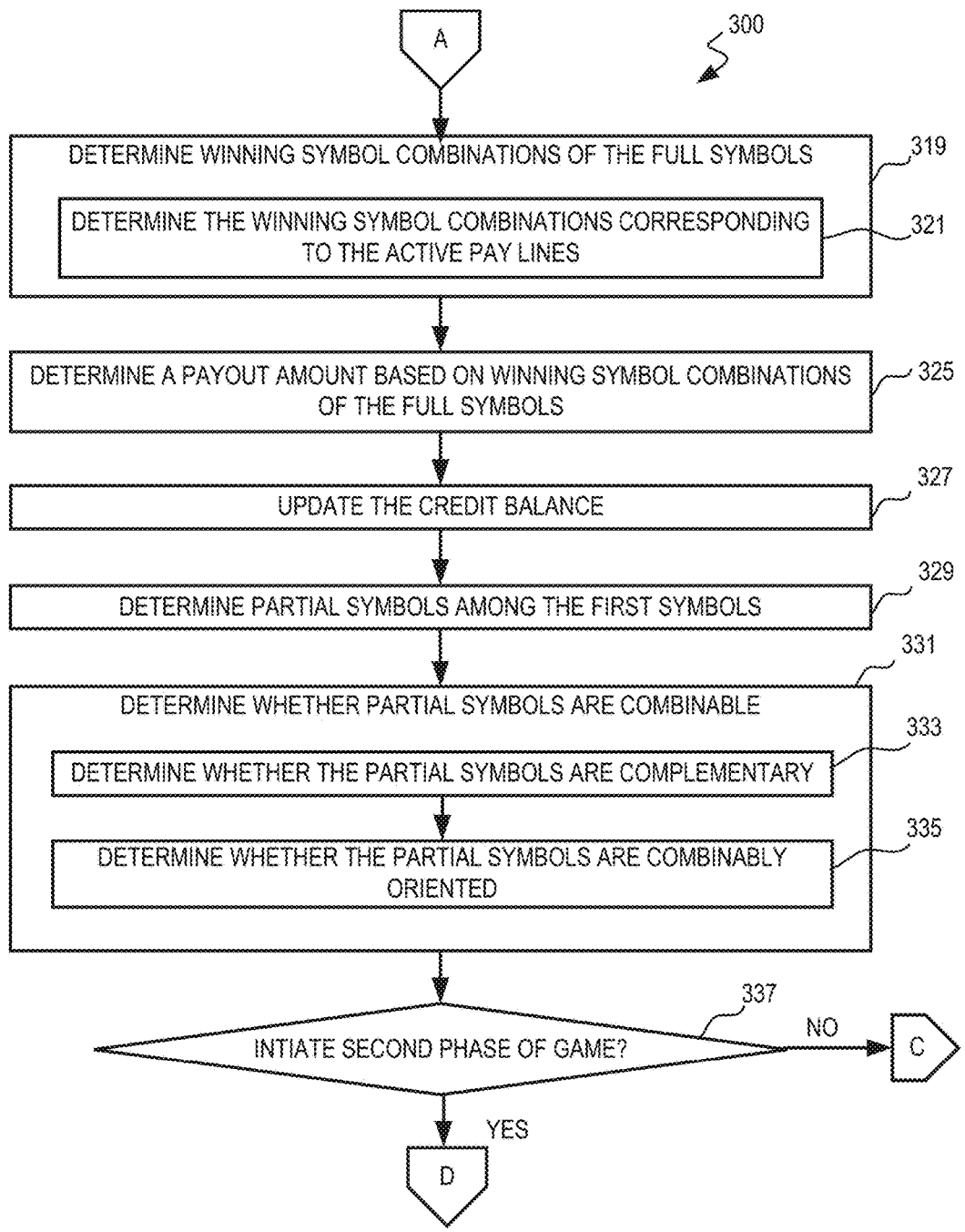
FIG. 3B shows a process flow diagram illustrating an example process of operating the gaming system in accordance with aspects of the present disclosure.
Figure 3C:
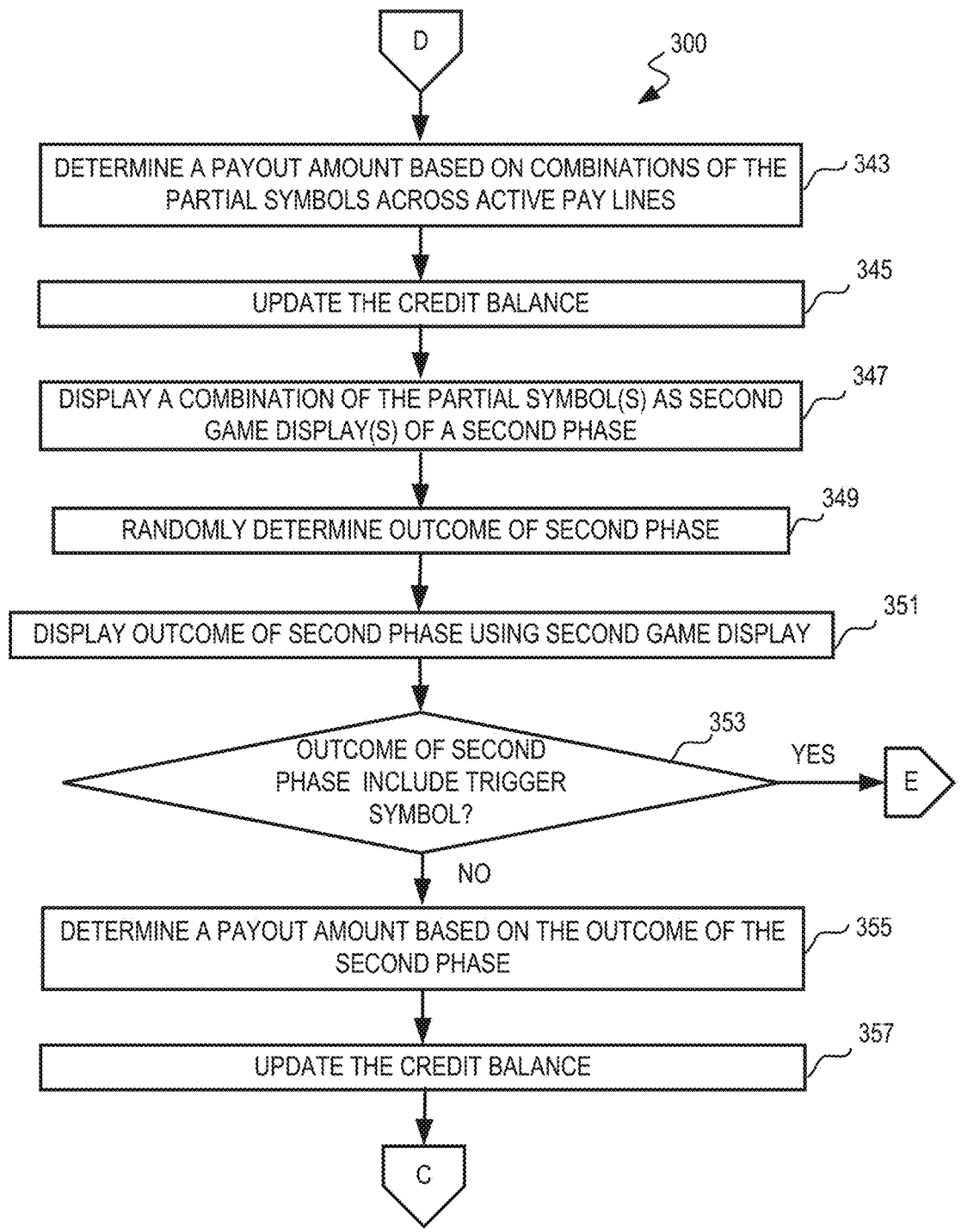
FIG. 3C shows a process flow diagram illustrating an example process of operating the gaming system in accordance with aspects of the present disclosure.
Figure 3D:
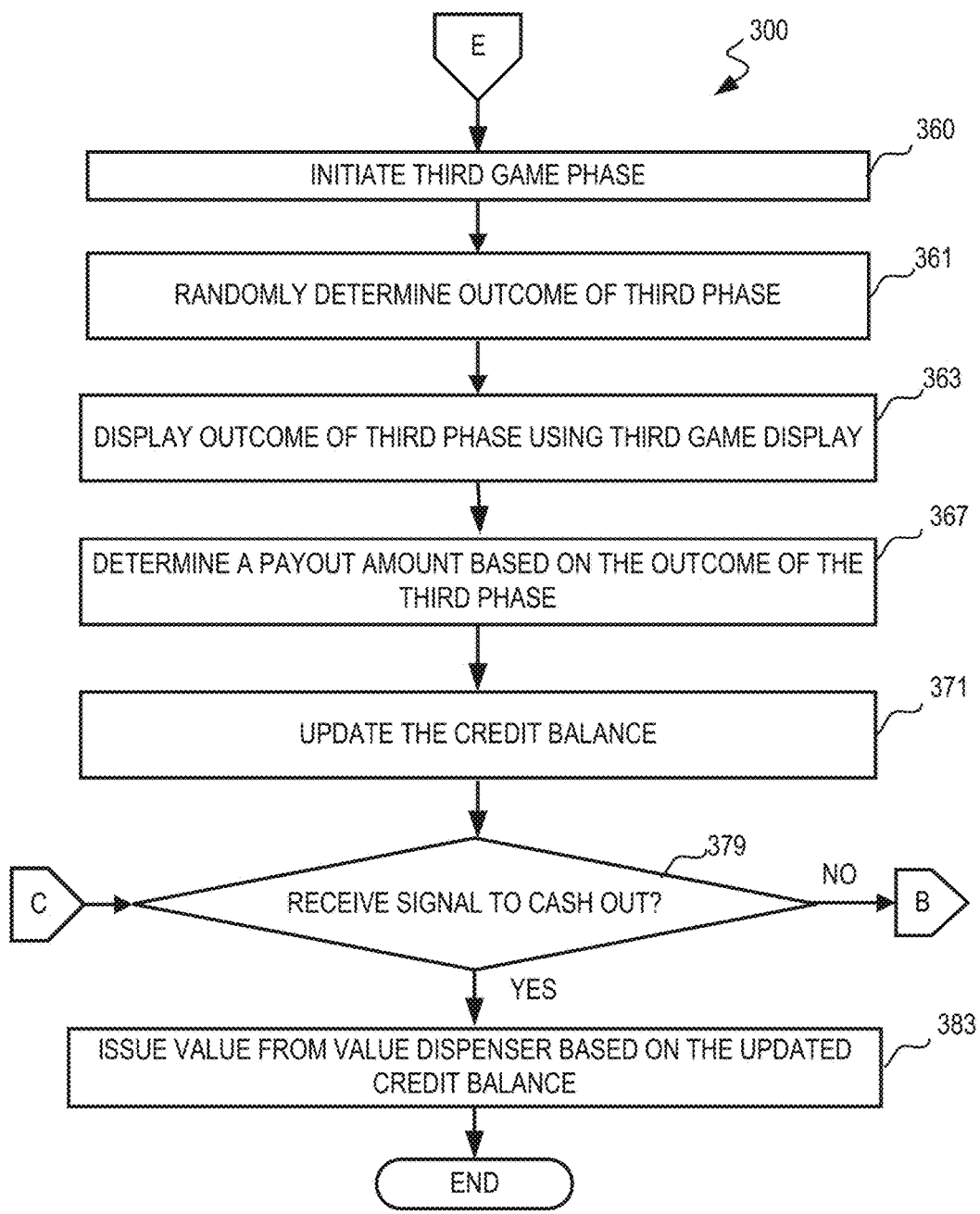
FIG. 3D shows a process flow diagram illustrating an example process of operating the gaming system in accordance with aspects of the present disclosure.

Continuing the process 300 in FIG. 3B, as indicated by off-page connector "A," at block 319, the gaming system determines winning symbol combinations of the full symbols displayed in the outcome of the first phase of the game at block 317. For example, the gaming system can determine winning symbol combinations by comparing the symbols displayed at block 317 to predetermined wagering outcomes (e.g., payout tables 215). In some implementations, at block 321, the gaming system only determines winning symbol combinations corresponding (e.g., displayed along) to the active pay lines determined at block 307 (e.g., active pay lines 403A and 403B in FIG. 4A). For example, a pay table may indicate that at least three Ace symbols (e.g., "A's" in symbol display positions 410A-410D in FIG. 4A) is a winning symbol combination. It is understood that the pay table may include a number of different winning symbol combinations and payouts. In some implementations, a pay table may indicate that as few as one symbol may be associated with a payout. Alternatively, two or more symbols may be used to form winning symbol combinations that result in a payout. It should be appreciated that displayed symbols may be evaluated in a left to right direction without consideration of pay line positions (i.e., all pay lines are considered active and evaluated also known as a "ways pay" or "all pay"). In some implementations, displayed symbols may be evaluated in a right to left direction.

At block 325, the gaming system determines a payout amount based on the winning symbol combinations determined at block 319. In some implementations, the gaming system only determines a payout amount based on winning symbol combinations formed across the reels along the active pay lines determined at block 307. At block 327, the gaming system updates the gaming credit balance updated at block 309 with the payout amount determined at block 325, if any. In some implementations, the gaming system also updates the displayed credit balance to correspond to the credit balance updated at block 327. In some implementations, the credit balance is not updated until a later time (e.g., after completion of a second or third phases of the game).

At block 329, the gaming system determines whether any partial symbols (e.g., partial symbols 425 in FIG. 4A) are displayed among the displayed in the first phase outcomes displayed at block 317. At block 331, the gaming system determines whether the partial symbols determined at block 329 are aligned in a predetermined relationship in the symbol display matrix and oriented so as to be combinable into a new game display area, thereby triggering a second phase of the game. In some implementations, the gaming system may reference a lookup table (e.g., data structure 900 in FIG. 9) to determine whether the partial symbols determined to be in adjoining reels and symbol display positions are complementary shapes and have a combinable orientation. In some implementations, determining whether the partial symbols are combinable includes, at block 331, determining whether the partial symbols are located in adjoining symbol display position (e.g., symbol display positions 410 in FIGS. 4A-C) in a game display (e.g., game display 400) of the first phase of the game. In some implementations, only partial symbols horizontally aligned in adjoining symbol display positions are combinable. And, in some implementations, only partial symbols horizontally or vertically aligned in adjoining symbol display position are combinable.

Additionally, determining whether the partial symbols are combinable at block 331 may include, at block 333, determining whether the partial symbols determined at 329 have complimentary shapes. More specifically, some implementations of the partial symbols are portions of two-dimensional shapes (e.g., circles, rectangles, triangles, stars, etc.) that, when combined form the complete shapes. The complementary shapes can be the same as one another or different from one another. For example, the partial symbols can include semi-circular symbols, such as partial symbols 601 and 603 in FIGS. 6A-6D, and semi-rectangular symbols with keyed edges (also referred to herein as "rectangular symbols" or "rectangular partial symbols") such as partial symbols 701 and 703 in FIGS. 7A-7C. As shown in FIGS. 6A-6D, the semi-circular partial symbols 601 and 603 have complimentary shapes that can be combined into a full circular shape. Similarly, the semi-rectangular symbols (with keyed edges) such as partial symbols 701 and 703 have complementary shapes that can be combined into a full rectangular shape. However, the semi-circular partial symbols 601 or 603 cannot be combined with the semi-rectangular partial symbols 701 and 703 to form a complete geometric shape because the shapes are not complementary.

Figure 7B:
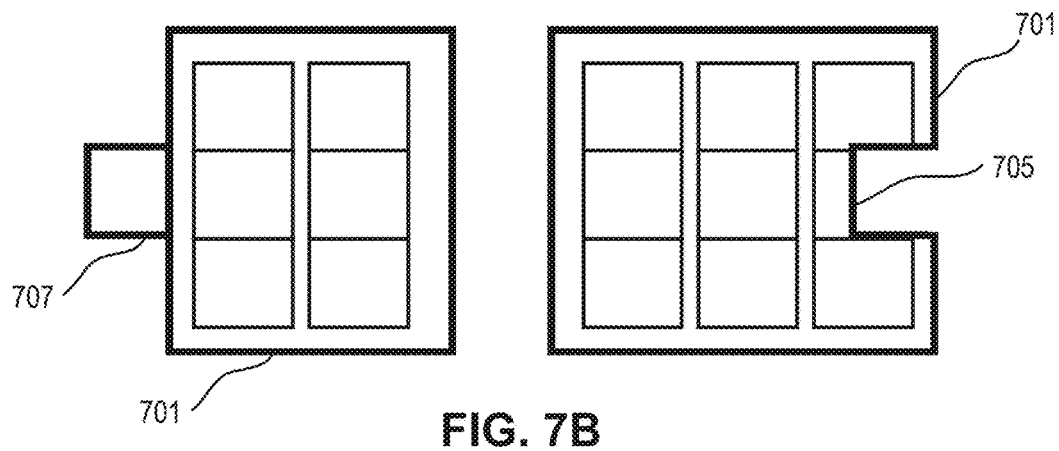
FIG. 7B shows a picture illustrating an example of complimentary partial symbols of a gaming system in a non-combinable orientation.
Figure 7C:
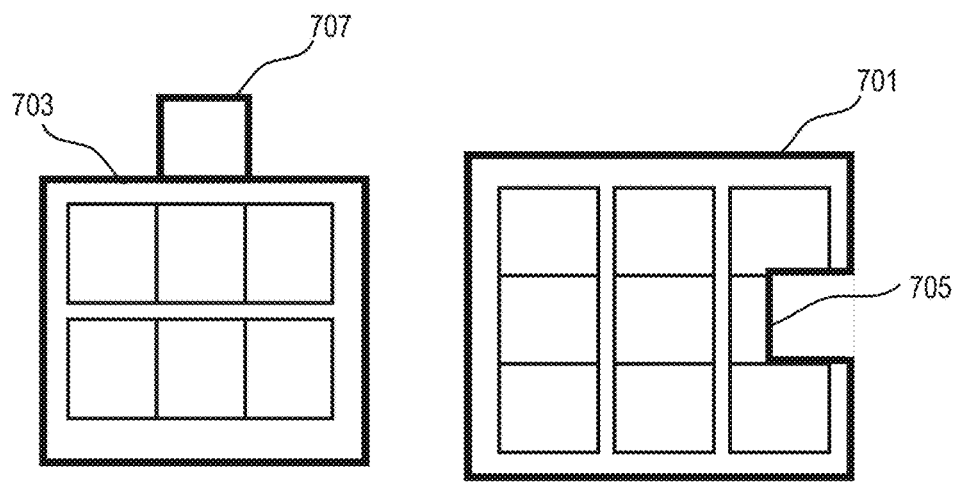
FIG. 7C shows a picture illustrating an example of complimentary partial symbols of a gaming system in a non-combinable orientation.
Figure 8:
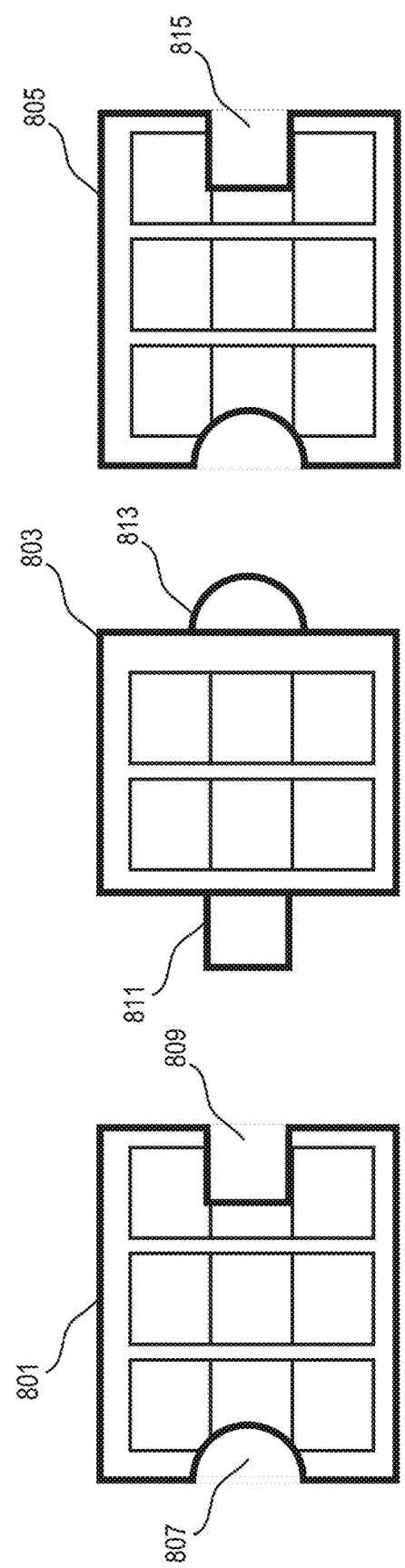
FIG. 8 shows a picture illustrating an example of complimentary partial symbols of a gaming system in a combinable orientation.

Further, determining whether the partial symbols are combinable at block 331 may include, at block 335, determining whether the partial symbols determined at block 329 are combinably oriented. For example, as illustrated in FIGS. 6A and 6B, the complementary semi-circular partial symbols are combinably oriented when flat sides 605 of the semi-circles are mutually facing. In contrast, as illustrated in FIGS. 6C and 6D, the complementary semi-circular partial symbols may not combinably oriented when the flat sides 605 face in different directions or away from one another. Additionally, as illustrated in FIGS. 7A and 8, complementary semi-rectangular symbols are combinably oriented when their keyed sides 705 and 707 are aligned. Whereas, as illustrated in FIGS. 7B and 7C, the complementary semi-rectangular symbols are not combinably oriented when the keyed sides 705 and 707 face in different directions or away from each other.

Figure 4A:
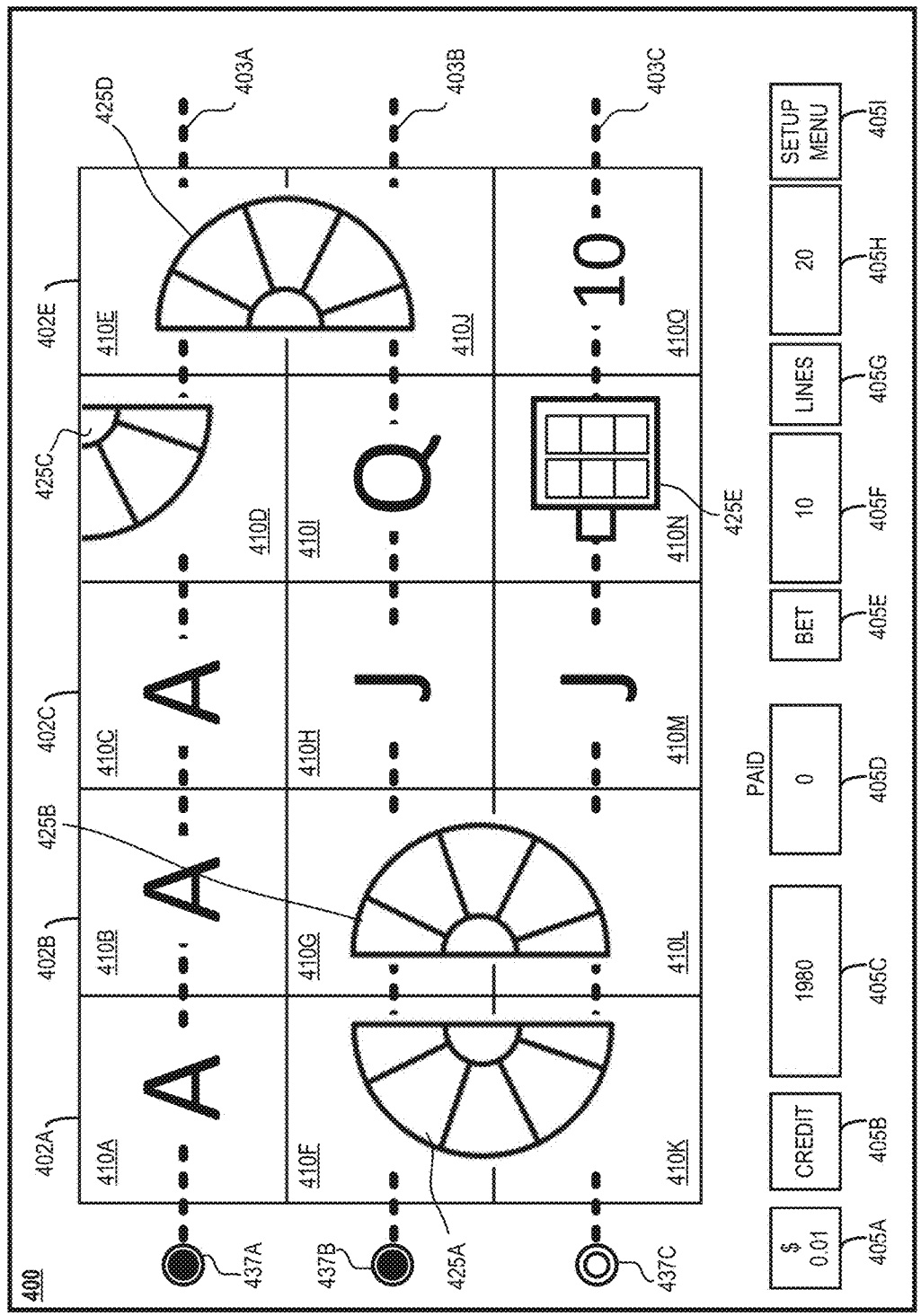
FIG. 4A shows a picture of a gaming system display illustrating an example of slot machine reels including full symbols and partial symbols in accordance with aspects of the present disclosure.
Figure 4B:
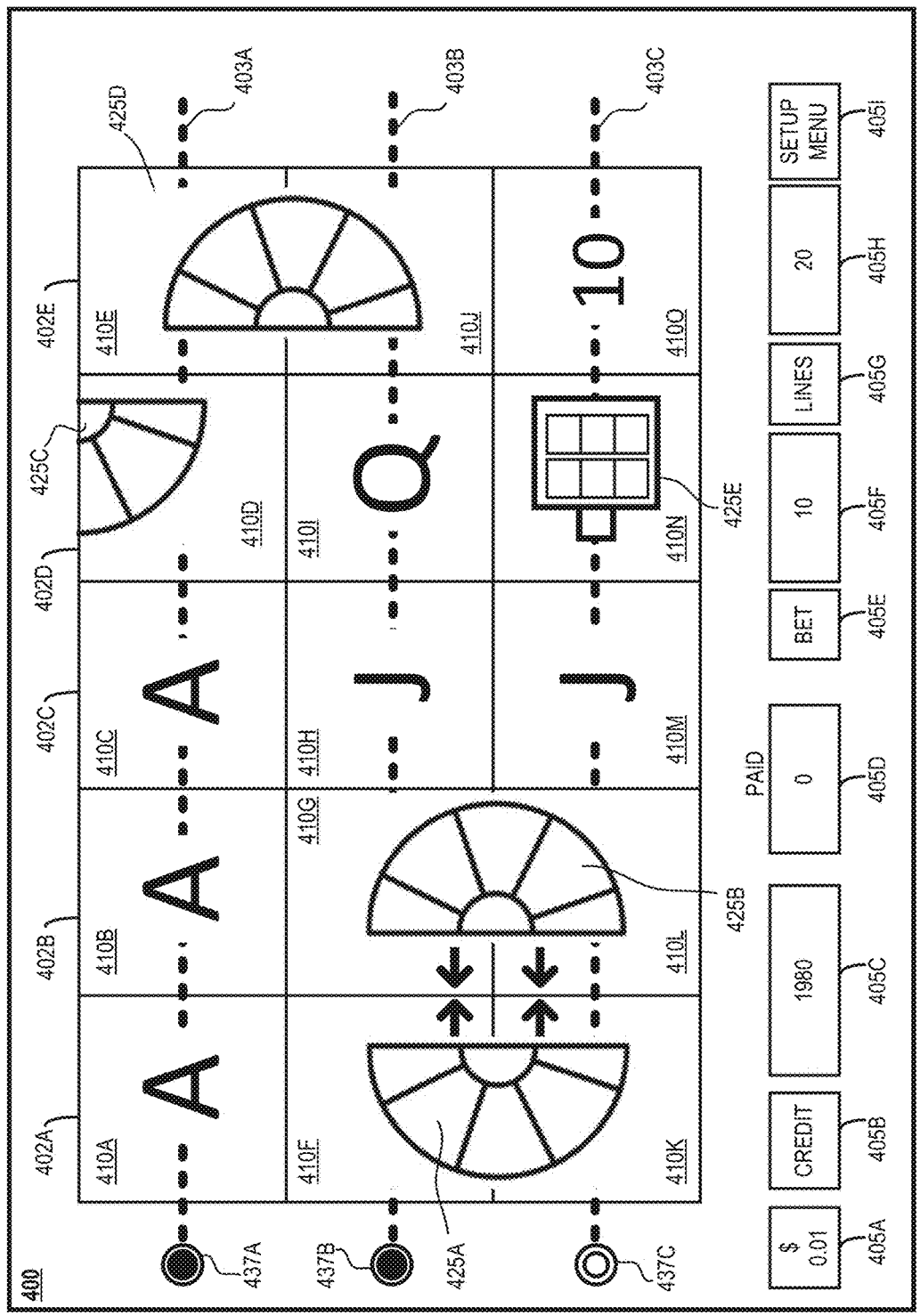
FIG. 4B shows a picture of a gaming system display illustrating an example of slot machine reels including full symbols and partial symbols in accordance with aspects of the present disclosure.
Figure 4C:
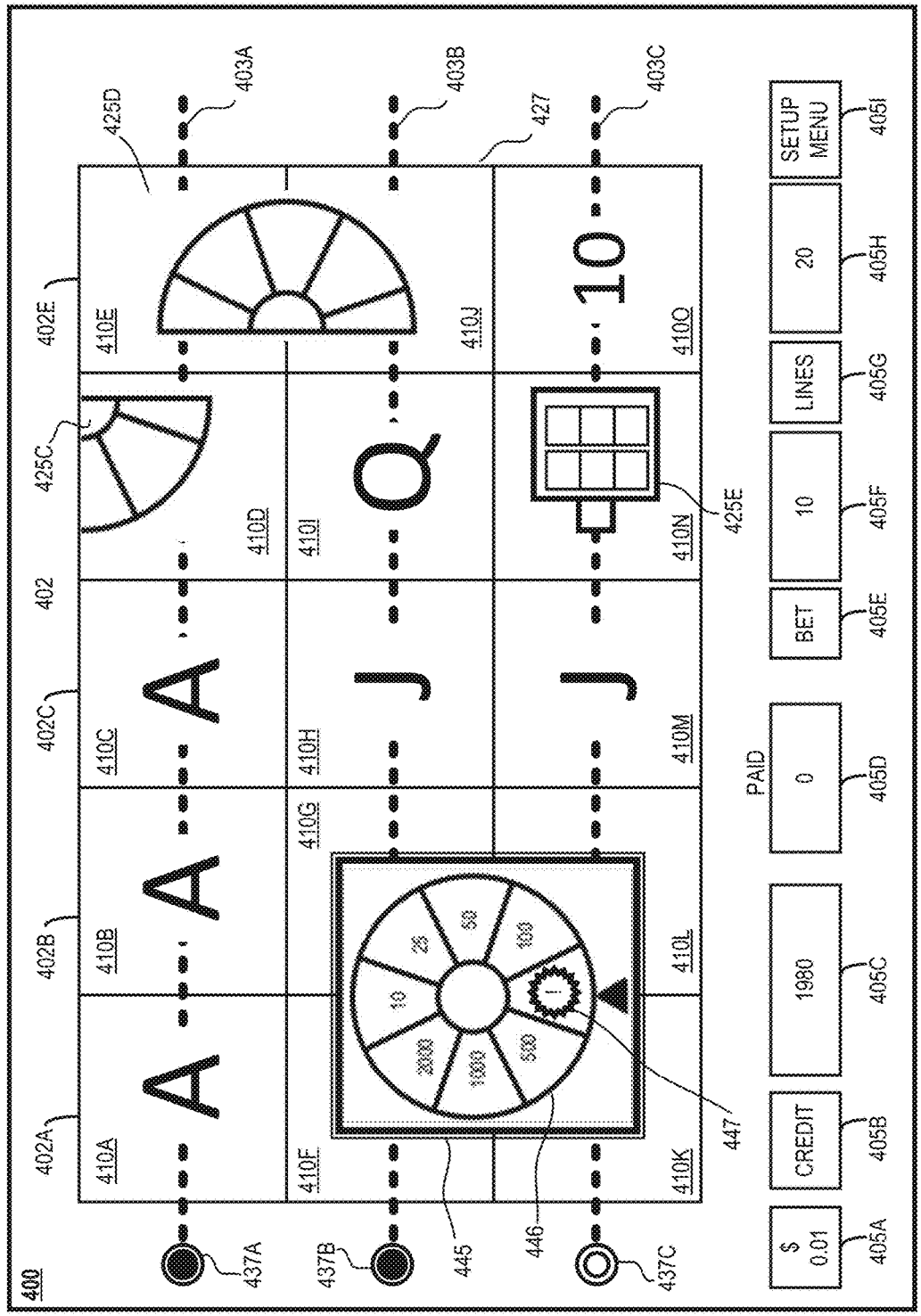
FIG. 4C shows a picture of a gaming system display illustrating an example of slot machine reels including full symbols and partial symbols in accordance with aspects of the present disclosure.

In a non-limiting example, FIGS. 4A-4C illustrates a game display 400 of a first phase including partial symbols 425A, 425B, 425C, 425D, and 425E. The partial symbol 425A spans symbol display positions 410F and 410K. The partial symbol 425B spans symbol display positions 410G and 410L. Part of partial symbol 425C is at symbol display positions 410C and another part of partial symbol 425 is off-screen. The partial symbol 425D spans symbol display positions 410E and 410J. And, partial symbol 425E occupies a single symbol display area 410N. As is evident in FIG. 4A, the partial symbols 425A and 425B are horizontally aligned in adjoining symbol display positions 410F and 410K and 410G and 410L, respectively. Accordingly, in implementations consistent with the present disclosure, partial symbols 425A and 425B can be combined, as illustrated in FIG. 4B, into a second game display area 445, as illustrated in FIG. 4C. In comparison, the partial symbols 425C and 425D are not aligned or in adjoining symbol display positions. Instead, the partial symbols 425C and 425D are not aligned and, instead, are disjunct. Further, the game display 400 lacks any partial symbol complimentary to partial symbol 425E. Accordingly, as illustrated, partial symbols 425C, 425D, and 425E cannot be combined into a second game display area 445.

At block 337, based on the determination of whether the partial symbols are combinable at 331, the gaming system determines whether to initiate a second phase of the game. If none of the partial symbols are determined at block 329 are determined to be combinable at block 331 (e.g., block 337 is "No"), then the process 300 proceeds to decision block 379 in FIG. 4D via off-page connector "C," as described below. On the other hand, if the partial symbols are determined at block 329 are determined to be combinable at block 331 (e.g., block 337 is "Yes"), the process 300 proceeds to block 343 in FIG. 3C via off-page connector "D."

At block 343, the gaming system may determine a payout amount based on the partial symbol combinations determined at block 337 in implementations where the pay table include combinations including one or more partial symbols.

In some implementations, the gaming system only determines a payout amount based on winning full symbol combinations formed across the reels along the active pay lines determined at block 307. At block 345, the gaming system updates the gaming credit balance updated at block 327 with the payout amount determined at block 343, if any. In some implementations, the gaming system also updates the displayed credit balance to correspond to credit balance updated at block 327. In some implementations, the credit balance is not updated until a later time (e.g., after completion of a second phase or upon completion of both a second phase and a third phase of the game).

At block 347, the gaming system combines the partial symbols determined to be combinable at 331 to form a second game display area and triggers the second phase of the game. In some implementations, the second game display corresponds to the combinable partial symbols determined at block 331. For example, if the partial symbols are semi-circular partial symbols (e.g., as shown in FIGS. 6A and 6B), then a gaming system may combine the semi-circular partial symbols to form an award wheel game display area (e.g., the second game display area). Additionally, if the partial symbol combinations are semi-rectangular symbols, then the gaming system may combine the semi-rectangular partial symbols to form a slot machine game display area (e.g., a matrix display of symbol positions within the combined symbol borders). In some implementations, the second game display area produced from the combination of partial symbols is displayed obscuring or replacing a portion the first game display at or near the location of the combined partial symbols. More specifically, the second game display area may replace or overlay the symbol display locations of the combined partial symbols in the first game display. In a non-limiting example, FIG. 4C shows an award wheel as a second game display area 445 replacing or overlaying the partial symbols 425A and 425B combined in FIG. 4B at symbol display location 410F and 410G.

Additionally, in some implementations, the quantity of second phase display areas provided is equal to the quantity the combinations of partial symbols determined at block 337. For example, each set of partial symbols determined to be combinable at block 331 can be combined into a respective second phase game display area. Accordingly, if the first phase outcome included two pairs of combinable semi-circular partial symbols, then the gaming system could combine each pair and provide two award wheel game display areas in the second phase of the game.

At block 349, the gaming system uses a random number generator to determine an outcome for the second phase of the game initiated at block 337. In some implementations, if a second phase of the game is triggered, the gaming system may select a plurality of symbols from one or more second sets of symbols associated with the second phase of the game and display the plurality of symbols on the second game display. In some implementations, selected symbols may be associated with an award value or another suitable game feature, and at least one selected symbol may be associated with an award that comprises a trigger symbol which may trigger a third phase of the game, as described more fully below.

At block 351, the gaming system displays the outcome determined at block 349 using the second game display area provided at block 347. The second phase outcome can be determined in a same or similar manner to that previously described with regard to the first phase symbols in reference to block 315. In some implementations, the second phase game display can be an award wheel (e.g., second game display area 445 in FIG. 4C), including a number of wheel segments where one or more segments have been associated with a symbol selected from the one or more second set of symbols that indicates the possible awards. During the second phase of the game, the gaming system may randomly determine a symbol from the plurality of symbols and highlight or indicate the selected one symbol on the second symbol display. In some implementations, the second game display area 445 may rotate (e.g., a spin of the award wheel) and come to a stop position indicated the determined outcome of the second phase of the game. Additionally, in accordance with aspects of the present disclosure, the second game display (e.g., second game display area 445) can include at least one trigger symbol (e.g., trigger symbol 447 in FIG. 4C) that initiates a third phase of the game.

At block 353, the gaming system determines whether the outcome of the second phase of the game displayed at block 351 includes the trigger symbol. If the gaming system determines that the outcome of the second phase displayed at block 351 does not include the trigger symbol (e.g., block 359 is "No"), then, at 355, the gaming system determines a payout amount based on the outcome displayed at block 351, updates, at block 357, the gaming credit balance updated at block 345 with the payout amount determined at block 343, if any, and proceeds to block 379 via off-page connector "C," as described below. In some implementations, the credit balance is not updated until a later time (e.g., after completion of a second phase of the game). On the other hand, if the gaming system determines at block 353 that the symbols displayed in the second phase outcome at 351 include at least one trigger symbol (e.g., block 353 is "Yes"), then the process 300 proceeds to block 360 in FIG. 3D via off-page connector "E."

Figure 5:
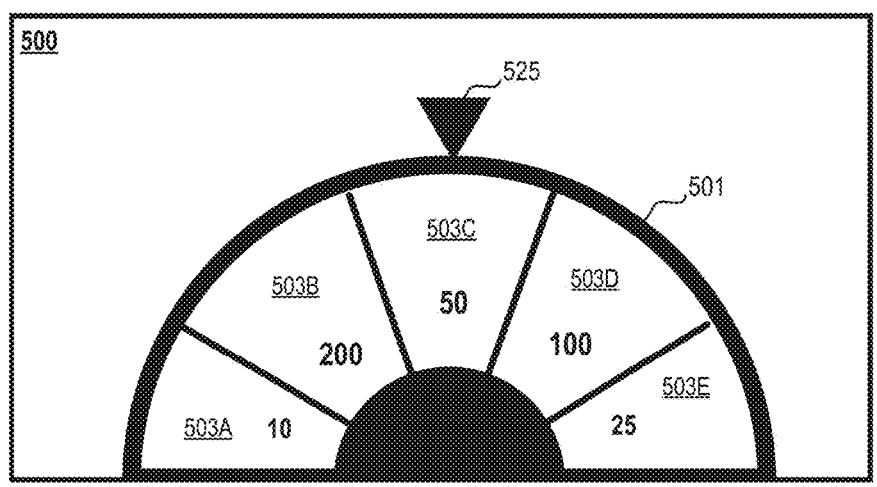
FIG. 5 shows a picture of a gaming system display illustrating an example of award wheels of an additional phase of a game in accordance with aspects of the present disclosure.

At block 360, the gaming system initiates a third phase of the game by displaying a third game display area (e.g., game display area 500 in FIG. 5). In some implementations, the third game display area may be co-located on the same display device as the first game display area and the second game display area. In some other implementations, the third game display may be located on a different display device (e.g., one of display devices 130 or 134, for example, as illustrated in FIG. 1).

At block 361, the gaming system uses a random number generator to determine an outcome for the third phase initiated at block 360. In some implementations, when a third phase of the game is triggered, the gaming system may select a plurality of symbols from one or more third sets of symbols associated with the third phase of the game and display the plurality of symbols on the third game display. In some implementations, the selected plurality of symbols may be associated with a segment of a large award wheel (see, e.g., award wheel 501 in FIG. 5). In some implementations, the number of symbols selected from the one or more third symbol sets is greater than the number of symbols selected from the one or more second symbol sets during the second phase of the game because the award wheel of the third phase of the game may have a greater number of award segments. In some implementations, selected symbols from the third symbol set may be associated with an award, such as credits awards or other suitable awards. In some implementations, the credit award values associated with symbols from the third symbol set may be greater than the credit award values associated with the second symbol sets during the second phase of the game.

During play of the third phase of the game, the gaming system may randomly determine a symbol from the plurality of symbols and highlight or indicate the selected symbol on the third symbol display. At block 363, the gaming system displays the outcome determined at block 361 using a third game display area. The third phase outcome can be determined in a same or similar manner to that previously described with regard to the second phase in reference to block 351. In some implementations, the third phase game display can be an award wheel (e.g., award wheel 501 in FIG. 5), including a number of wheel segments (e.g., wheel segments 503A . . . 503E in FIG. 5) indicating awards (e.g., credit amounts or payout amounts). For example, the gaming system may identify wining symbols coinciding with a selector (e.g., index selector 525 in FIG. 5).

At block 371, the gaming system may update the player's gaming credit balance updated in accordance with the payout amount determined at block 367, if any. In some implementations, the gaming system also updates the displayed credit balance to correspond to the current credit balance. At block 379, the gaming system may receive a signal to end game play or "cash out" via a player input device of the gaming system (e.g., which would end the gaming session in some implementations). If a cash out signal is not received (e.g., block 381 is "No"), then the method 300 iteratively returns to block 305 via off-page connector "B". On the other hand, if the gaming device receives the cash out signal (e.g., block 381 is "Yes"), then at block 383, the gaming system dispenses a value to the player, through a value dispenser (e.g., using value dispenser 229) based on the player's gaming credit balance updated at block 371. The process 300 then ends.

FIGS. 4A-4C show pictures of a game display area 400 of a gaming system (e.g., gaming system 100) in accordance with aspects of the present disclosure. The example game display area 400 represents a virtual video slot machine-type game display including five (5) reels 402A, 402B, 402C, 402D, and 402E (collectively, "reels 402"), three (3) pay lines 403A, 403B, and 403C (collectively, "pay lines 403"), and information areas and buttons 405A-405I (collectively, "information areas and buttons 405"). In some implementations, the gaming system may include a game with more reels or fewer reels.

The reels 402 may display an outcome of the first phase of game, including one or more full symbols (e.g., 10, J, Q, K, and A) and one or more partial symbols 425. More specifically, the reels 402 and the pay lines 403 of the game display 400 provide a matrix (e.g., a 5×3 matrix) of symbol display positions 410A, 410B, 410C, 410D, 410E, 410F, 410G, 410H, 410I, 410J, 410K, 410L, 410M, 410N, and 410O (collectively, "symbol display positions 410") that display symbols randomly selected from one or more predefined symbol sets (e.g., game symbols 214). The reels 402 may display the game symbols that the gaming system selected (e.g., generated) from the sets of symbols in their respective symbol display positions 410. More specifically, the example shown in FIG. 4A arranges the symbol display positions 410 so as to provide the appearance of five game reels 402, the individual reels 402A, 402B, 402C, 402D, and 402E visibly show three symbols. For example, as shown in FIG. 4A, symbol display positions 410A, 410F, and 410K are associated with reel 402a; symbol display positions 410B, 410G, and 410L are associated with reel 402b; symbol display positions 410C, 410H, and 410M are associated with reel 402C; and symbol display positions 410D, 410I, and 410N are associated with reel 402D; and symbol display positions 410E, 410J, and 410O are associated with reel 402E. The arrangement illustrated in the implementation of FIG. 4 thus creates a visible display area 400 including the reels 402, which comprise three visible symbol positions for each reel. When viewed together, the reels 402 may appear like a 3-row by 5-column reel array (i.e., a matrix) in display 400. In other implementations, smaller or larger visible areas of the reels can be displayed. During one play of a game, the gaming system may animate individual reels 402 to represent the reels spinning in one direction around a common axis so as to simulate the motion of slot machine reels. When the spinning stops, the gaming system may display the respective symbol displays 410 for the reels as being indexed with the pay lines 403, so as to represent an outcome of a slot machine game.

The information areas and buttons 405 represent player interface devices (e.g., input device 115. In the present example, information area 405A illustrates an example value of one credit for the game displayed in game display 400. Credit meters 405B and 405C illustrate an example of the amount of the player's available credits. Information area 405D illustrates the amount of credits a player has won. Because FIG. 4 illustrates the start of a play of a game, the information area 405D shows zero credits have been won. Button 405E illustrates a software button that the player can select to place a bet or wager. The information areas and buttons 405A-405I are illustrated in a particular arrangement for the sake of illustration. It is understood that the information areas and buttons 405A-405I may be rearranged in different implementations and may include more or fewer display areas and buttons 405A-405I than illustrated. It should be appreciated that the functionality of button 405E ("Bet") may also be replicated or replaced with a hardware button on the gaming system 100. Information area 405F illustrates that the player has selected to wager 10 credits. Button 405G illustrates a software button that the player can select to determine how many pay lines to wager on. It should be appreciated that the functionality of button 405G may also be replicated or replaced with a hardware button on the gaming system 100. Information area 405H illustrates that the player selected to wager on ten (10) pay lines. Button 405I illustrates a software button that the player can select to obtain information about the game, change certain aspects of the game, obtain help, place an order, etc.

FIGS. 4A-4C further illustrate an example of gaming system executing an evaluation of the symbols generated as an outcome of a first phase of a game on reels 402. In accordance with aspects of the present disclosure, the symbols of a game outcome can include partial symbols 425, including partial symbols 425A, 425B, 425C, and 425D. In a non-limiting example of a particular outcome of the first phase, complimentary partial symbols 425A and 425B are displayed in adjoining symbol display positions 410F, 410K and 410G, 410L, respectively, and in orientations combinable into a complete, circular symbol. Additionally, the outcome of the first phase can include unaligned partial symbols 425C and 425D in neighboring, but non-adjoining, symbol display positions 410D and 410E, 410J, respectively, that cannot be combined. Further, the outcome of the first phase can include partial symbol 425E, which lacks any complementary partial symbol in the present example and as such, cannot be combined. In the case of partial symbols 425A and 425B, implementations of the gaming system combine (e.g., fuses) the partial symbols 425A and 425B (as shown, e.g., in FIG. 4B) to provide (e.g., trigger) a second game display area 445 of a second phase of the game, as previously described herein (see, e.g., block 347 of FIG. 3C). Upon initiation of the second phase of the game, the gaming system may show a game display 445 comprising, e.g., an award wheel, in a second phase display area 445, as shown in FIG. 4C, that can be rotated before revealing an outcome of the second phase. In some implementations, the gaming system generates the outcome of the second phase game display 445 randomly with an RNG. When a display of the second phase game display 445 stops rotating, one or more displayed stop positions indicating the outcome, which may be an award symbol 446 or a trigger symbol 447. If the outcome of the second phase game display is a trigger symbol 447, the gaming system the award wheel may trigger a third phase of the game presenting another award wheel (e.g., game display area 500 in FIG. 5), as previously described herein.

It is understood that FIGS. 4A-4C illustrate one example implementation of a game display area 400 that the gaming system may display on a display device (e.g., display device 120) of the gaming system. It should be also appreciated that the game display area 400 is merely representative and it and may have greater, fewer, or different game elements (e.g., symbol display positions, symbols, etc.) than shown in the game display area 400. It is further understood that other games may be used for the second phase of the game (e.g., a slot machine-type game).

While symbol display positions 410 are illustrated with defined boxes, it should be appreciated that in some implementations, the defined boxes may not be visible to the player. It should also be appreciated that in some implementations, the symbol display positions 410 are other shapes or not defined shapes and may not be associated with reels. Further, it will be appreciated that other displays of the gaming system may be used (e.g., display device 130 and 134) to display game display area 400. For example, in some implementations, the symbol display positions 410 may not be associated with reels 402. Also, the reels 402 may spin in different directions, rather than the same direction. As also illustrated in FIGS. 4A-4C, the reels 402 are displayed substantially side by side. It is understood that the reels 402 can be displayed with any suitable amount of separation (e.g., less than two inches) or no separation.

FIG. 5 shows a picture of a game display area 500 of a gaming system (e.g., gaming system 100) illustrating an example of award wheel 501 that may be provided as an implementation of a game display of a third phase of a game consistent with aspects of the present disclosure. More specifically, FIG. 5 illustrates a screen shot of one implementation of a gaming system (e.g., gaming system 100) providing a game display comprising an award wheel 501 that can provide additional or enhanced payouts to a player. The award wheel 501 can be virtual award wheels or mechanical award wheels that are divided into a number of sections 503 comprising symbol display positions that display game symbols indicating various awards, as previously described herein. It is understood that FIG. 5 illustrates one example implementation of a game display area 500 that the gaming system may display on a display device (e.g., display device 120). It should be also appreciated that the award wheel game display 501 game display area 500 is merely representative and it and may have greater, fewer, or different game elements (e.g., symbol display positions, symbols, etc.) than shown in the game display area 500. It is further understood that other game displays may be used for the third phase of the game (e.g., a slot machine-type game).

FIGS. 6A and 6B show pictures illustrating example of complimentary, semi-circular partial symbols 601 and 603 of a gaming system (e.g., gaming system 100) in combinable orientations. As detailed previously herein, the partial symbols 601 and 603 have complimentary shapes including one flat side 605 that, when mutually facing, allow the semi-circular shapes to form a full-circular shape, which may represent an award wheel. FIGS. 6C and 6D illustrate an example of the complimentary, semi-circular partial symbols 601 and 603 of the gaming system in a non-combinable orientation in which the flat sides 605 are not mutually facing and, therefore, not oriented such that the symbols can be combined.

FIG. 7A shows a picture illustrating an example of complimentary, semi-rectangular partial symbols 701 and 703 of the gaming system in a combinable orientation. As detailed previously herein, the partial symbols 701 and 703 have complimentary keyed profile 705 and 707 that, when aligned, allow the semi-rectangular shapes to form a full-rectangles shape, which may represent a number of slot machine reels. FIGS. 7B and 7C shows pictures illustrating an example of complimentary, semi-rectangular partial symbols 701 and 703 in a non-combinable orientations in which the keyed sides 705 and 707 are not aligned. In one implementation, when rectangular symbols combine in a first phase of a game to trigger a second phase of the game, the second game display area 445 of FIG. 4C may display a row by column matrix and the gaming system may execute a play of the slot machine game in the second phase display area. As in the award wheel implementation discussed above, outcomes of the second phase slot machine implementation may include a determination of awards including monetary awards and triggering of a third phase of the game.

FIG. 8 shows a picture illustrating another example of complimentary, semi-rectangular partial symbols 801, 803, and 805 in a combinable orientation in which the keyed side 807, 809, 811, and 813 sides are aligned. The semi-rectangular partial symbols 801, 803, and 805 may combine in a same or similar manner as described above with regard to partial symbols 701 and 703. Additionally, partial symbols 801, 803, and 805 can include more than keyed side that can align with more than one complimentary partial symbol.

FIG. 9 shows a picture illustrating an example of data structure 900 of a gaming system (e.g., gaming system 100) identifying combinable and non-combinable partial symbols. As described previously herein, the gaming system can reference the data structure 900 using symbol identifiers 903 to determine complimentary partial symbols 901, and combinable orientations of the partial symbols 907. For example, by reference the data structure 900, the gaming system can determine that symbol identifier C03 is the only symbol included in among orientations of the partial symbols 907 that is complimentary type and combinably oriented with symbol identifier C01. Additionally, by reference to column 905 of the data structure 900, the gaming system can determine a type of second game display (e.g., award wheel or slot machine) corresponding to a combination of partial symbols.

Based on the forgoing description, it should be appreciated that a gaming system and process with improvements to game outcomes creates new and very exciting ways for a player to obtain improved winnings with a potential to earn greater payouts. Such a potential to earn greater payouts creates a greatly improved sense of anticipation for players.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent processes and apparatuses within the scope of the disclosure, in addition to those enumerated herein will be apparent to those skilled in the art from the foregoing descriptions. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flows shown above may be used, with steps re-ordered, added, or removed. Accordingly, other implementations are within the scope of the following claims.

I claim:

1. A gaming system comprising:
a cabinet;
one or more display devices supported by the cabinet;
a player input device supported by the cabinet;
a value acceptor supported by the cabinet;
a value dispenser supported by the cabinet;
a game controller supported by the cabinet and operably connected to the one or more display devices, the player input device, the value acceptor, the value dispenser, the game controller comprising a random number generator, a memory device, and a processor, wherein the memory device stores program instructions that, when executed by the processor, cause the gaming system to perform operations including:
receiving, by the value acceptor, a monetary value;
determining an amount of credit available to play a game based on a monetary value received by the value acceptor;
receiving, via the player input device, a wager for the game;
decreasing the amount of credit by the wager;
initiating, based on the received wager, a first phase of a plurality of game phases;
determining, using the random number generator, an outcome of the first phase, wherein the outcome of the first phase includes a plurality of full symbols and a plurality of partial symbols;
displaying, using the one or more display devices, a first game display of the first phase including the outcome of the first phase;
determining that the outcome of the first phase includes complementary partial symbols of the plurality of partial symbols aligned in adjoining positions of the first game display;
displaying a combination of the complimentary partial symbols, wherein the combination of the complimentary partial symbols provides a second game display of a second phase of the plurality of game phases;
determining, using the random number generator, an outcome of the second phase
displaying the outcome of the second phase using the second game display;
converting the outcome of the second phase to a second phase payout;
displaying, using the one more display devices, the values of the second phase payout;
updating the amount of the credit with the second phase payout; and
issuing a monetary value using the value dispenser based on the updated amount of the credit upon receipt of a cash out signal via the player input device,
wherein:
the plurality of partial symbols comprise one or more complementary shapes, and
the one or more complementary shapes have at least one combinable side and at least one non-combinable side.

2. The gaming system of claim 1, wherein the operations further comprise:
determining that one or more combinations of the plurality of full symbols correspond to one or more full-symbol winning combinations;
converting the one or more full-symbol winning combinations to a first phase payout;
displaying, using the one more display devices, the values of the first phase payout; and
updating the amount of the credit with the first phase payout.

3. The gaming system of claim 1, wherein determining the outcome of the second phase comprises:
determining that the outcome of the second phase comprises a trigger symbol;
displaying, based on the trigger symbol, a third game display of a third phase of the plurality of game phases;
determining, using the random number generator, an outcome of the third phase;
displaying the outcome of the third phase using the third game display;
converting the outcome of the third phase to a third phase payout; and
updating the amount of the credit with the third phase payout.

4. The gaming system of claim 1, wherein the second game display comprises one or more award wheels.

5. The gaming system of claim 3, wherein the third game display comprises an award wheel.

6. The gaming system of claim 1, wherein:
the one or more complementary shapes comprise semi-circular symbols; and
the at least one combinable side comprises a flat side of the semi-circles.

7. The gaming system of claim 1, wherein:
the one or more complementary shapes comprise keyed rectangular shapes; and
the at least one combinable side comprises a keyed side of the rectangles.

8. The gaming system of claim 1, wherein determining that the outcome of the first phase includes complementary partial symbols of the plurality of partial symbols aligned in adjoining positions of the first game display comprises:
determining that the at least one combinable side of the complementary partial symbols are aligned in a combinable orientation.

9. A method of operating a gaming system comprising:
receiving, by a processor via a value acceptor, a monetary value;
determining, by the processor, an amount of credit available to play a game based on a monetary value received by the value acceptor;
receiving, by the processor via a player input device, a wager for the game;
decreasing, by the processor, the amount of credit by the wager;
initiating, by the processor, based on the receiving the wager, a first phase of a plurality of game phases;
determining, by the processor using a random number generator, an outcome of the first phase, wherein the outcome of the first phase includes a plurality of full symbols and a plurality of partial symbols;

displaying, by the processor using one or more display devices, a first game display of the first phase including the outcome of the first phase;

determining, by the processor, that the outcome of the first phase includes complementary partial symbols of the plurality of partial symbols aligned in adjoining positions of the first game display;

displaying, by the processor, a combination of the complimentary partial symbols, wherein the combination of the complimentary partial symbols provides a second game display of a second phase of the plurality of game phases;

determining, by the processor using the random number generator, an outcome of the second phase;

displaying, by the processor, the outcome of the second phase using the second game display;

converting, by the processor, the outcome of the second phase to a second phase payout;

displaying, by the processor using the one more display devices, the values of the second phase payout;

updating, by the processor the amount of the credit with the second phase payout; and issuing, by the processor, a monetary value using the value dispenser based on the updated amount of the credit upon receipt of a cash out signal via the player input device, wherein:
the plurality of partial symbols comprise one or more complementary shapes, and
the one or more complementary shapes have at least one combinable side and at least one non-combinable side.

10. The method of claim 9, further comprising:
determining that one or more combinations of the plurality of full symbols correspond to one or more full-symbol winning combinations;
converting the one or more full-symbol winning combinations to a first phase payout;
displaying, using the one more display devices, the values of the first phase payout; and
updating the amount of the credit with the first phase payout.

11. The method of claim 9, wherein determining the outcome of the second phase comprises:
determining that the outcome of the second phase comprises a trigger symbol;
displaying, based on the trigger symbol, a third game display of a third phase of the plurality of game phases;
determining, using the random number generator, an outcome of the third phase;
displaying the outcome of the third phase using the third game display;
converting the outcome of the third phase to a third phase payout; and
updating the amount of the credit with the third phase payout.

12. The method of claim 9, wherein the second game display comprises one or more award wheels.

13. The method of claim 11, wherein the third game display comprises an award wheel.

14. The method of claim 9, wherein:
the one or more complementary shapes comprise semi-circular symbols; and
the at least one combinable side comprises a flat side of the semi-circles.

15. The method of claim 9, wherein:
the one or more complementary shapes comprise keyed rectangular shapes; and
the at least one combinable side comprises a keyed side of the rectangles.

16. The method of claim 9, wherein determining that the outcome of the first phase includes complementary partial symbols of the plurality of partial symbols aligned in adjoining positions of the first game display comprises:
determining that the at least one combinable side of the complementary partial symbols are aligned in a combinable orientation.

17. A system comprising:
a cabinet;
one or more display devices supported by the cabinet;
a player input device supported by the cabinet;
a value acceptor supported by the cabinet;
a value dispenser supported by the cabinet;
a game controller supported by the cabinet and operably connected to the one or more display devices, the player input device, the value acceptor, the value dispenser, the game controller comprising a random number generator, a memory device, and a processor, wherein the memory device stores program instructions that, when executed by the processor, cause the gaming system to perform operations including:
receiving, by the value acceptor, a monetary value to establish a credit balance;
receiving, via the player input device, a wager;
initiating a first phase of a plurality of game phases in response to the wager;
determining, using the random number generator, an outcome of the first phase, wherein the outcome of the first phase includes a plurality of symbols;
triggering a second phase of the game when the outcome of the first phase includes a pair of symbols aligned in a predetermined relationship;
displaying, in response to triggering the second phase, a game display comprising a combination of the pair of symbols;
determining any monetary awards based the first phase and the second phase;
updating the credit balance with the determined monetary awards; and
issuing a monetary value using the value dispenser based on the updated amount of the credit balance upon receipt of a cash out signal via the player input device,
wherein the pair of symbols comprise complementary shapes having at least one combinable side and at least one non-combinable side.

18. The system of claim 17, further comprising determining that the outcome of the first phase includes a plurality of complementary partial symbols aligned in adjoining symbol display positions of reels and determining that the plurality of complementary partial symbols are aligned in a combinable orientation.

* * * * *